(12) United States Patent
Mast

(10) Patent No.: US 12,048,870 B2
(45) Date of Patent: *Jul. 30, 2024

(54) WEARABLE TRAINING APPARATUS, A TRAINING SYSTEM AND A TRAINING METHOD THEREOF

(71) Applicant: 1241620 Alberta Ltd., Sherwood Park (CA)

(72) Inventor: Lyle Mast, Sherwood Park (CA)

(73) Assignee: 1241620 ALBERTA LTD., Sherwood Park (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,060

(22) Filed: May 24, 2023

(65) Prior Publication Data
US 2023/0338816 A1 Oct. 26, 2023

Related U.S. Application Data

(63) Continuation of application No. 16/704,943, filed on Dec. 5, 2019, now Pat. No. 11,697,055, which is a
(Continued)

(51) Int. Cl.
*A63B 71/06* (2006.01)
*A61H 5/00* (2006.01)
(Continued)

(52) U.S. Cl.
CPC .......... *A63B 71/0622* (2013.01); *A61H 5/00* (2013.01); *G02C 7/083* (2013.01); *G02C 7/101* (2013.01);
(Continued)

(58) Field of Classification Search
CPC .............. A63B 71/022; A63B 2102/02; A63B 2102/24; A63B 2102/32; A63B 24/0087; A63B 69/0026; A63B 69/3608; A63B 69/38; A63B 2024/0025; A63B 2071/0666; A63B 2071/0694; A63B 2220/806;
(Continued)

(56) References Cited

U.S. PATENT DOCUMENTS

| 2010/0182564 | A1* | 7/2010 | Smith | A61H 5/00 351/203 |
| 2017/0255028 | A1* | 9/2017 | Maggi | G02C 7/105 |
| 2018/0201101 | A1* | 7/2018 | Hue | B60J 3/04 |

* cited by examiner

*Primary Examiner* — Sharrief I Broome
(74) *Attorney, Agent, or Firm* — Locke Lord LLP; Tim Tingkang Xia, Esq.

(57) ABSTRACT

A wearable training apparatus has a vision-control assembly for engaging a user's face about the user's eyes. The vision-control assembly has a see-through area about the user's eyes and an opaque area surrounding the see-through area at least on a temporal side and an inferior side thereof. The opaque area is for substantially blocking at least major portions of the natural monocular vision-areas of a natural field of vision (FOV) of the user's eyes, said natural monocular vision-areas being peripheral to a natural binocular vision-area on respectively temporal sides. The see-through area is for forming a reduced FOV about a gaze direction. The reduced FOV has a span encompassing at least a major portion of the natural binocular vision-area of the natural FOV of the user's eyes about the gaze direction thereof, said natural binocular vision-area being at an angular center of the natural FOV.

20 Claims, 25 Drawing Sheets

Related U.S. Application Data continuation-in-part of application No. 16/330,757, filed as application No. PCT/CA2018/051535 on Nov. 30, 2018, now abandoned.

(60) Provisional application No. 62/593,362, filed on Dec. 1, 2017.

(51) Int. Cl.
*A63B 24/00* (2006.01)
*A63B 69/00* (2006.01)
*A63B 69/36* (2006.01)
*A63B 69/38* (2006.01)
*A63B 102/02* (2015.01)
*A63B 102/24* (2015.01)
*A63B 102/32* (2015.01)
*G02B 27/01* (2006.01)
*G02C 7/08* (2006.01)
*G02C 7/10* (2006.01)
*G02C 7/16* (2006.01)
*G02C 11/00* (2006.01)
*G02C 11/08* (2006.01)

(52) U.S. Cl.
CPC ............. G02C 7/16 (2013.01); G02C 11/00 (2013.01); *A63B 2024/0025* (2013.01); *A63B 24/0087* (2013.01); *A63B 69/0026* (2013.01); *A63B 69/3608* (2013.01); *A63B 69/38* (2013.01); *A63B 2071/0666* (2013.01); *A63B 2071/0694* (2013.01); *A63B 2102/02* (2015.10); *A63B 2102/24* (2015.10); *A63B 2102/32* (2015.10); *A63B 2220/806* (2013.01); *A63B 2220/807* (2013.01); *A63B 2225/50* (2013.01); *G02B 2027/0178* (2013.01); *G02C 11/08* (2013.01)

(58) Field of Classification Search
CPC ................ A63B 2220/807; A63B 2225/50; A61H 5/00; G02C 7/083; G02C 7/16; G02C 7/101; G02C 11/00; G02C 11/08; G02B 2027/0178
See application file for complete search history.

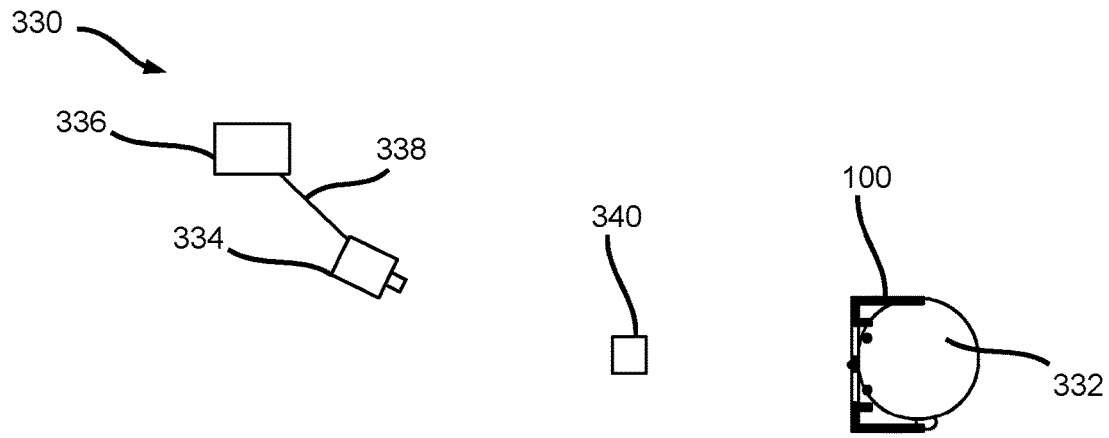
FIG. 33
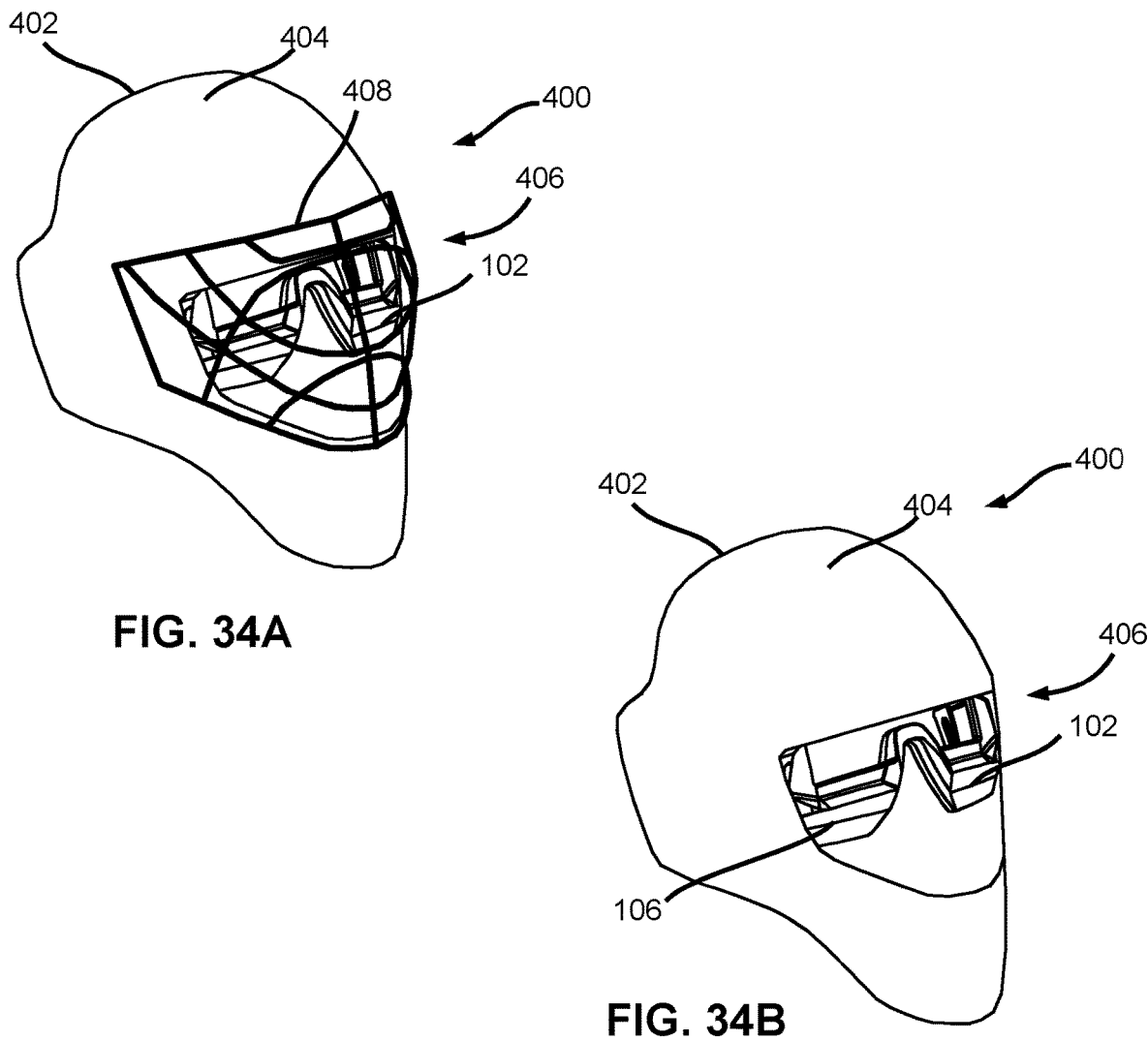
FIG. 34A
FIG. 34B

WEARABLE TRAINING APPARATUS, A TRAINING SYSTEM AND A TRAINING METHOD THEREOF

CROSS-REFERENCE TO RELATED APPLICATIONS

This application is a continuation of U.S. patent application Ser. No. 16/704,943, filed on Dec. 5, 2019, which is a continuation-in-part of U.S. patent application Ser. No. 16/330,757, which is a US national phase application of PCT Application Serial No. PCT/CA2018/051535 filed on Nov. 30, 2018 and claims the benefit of U.S. Provisional Patent Application Ser. No. 62/593,362, filed Dec. 1, 2017, the content of each of which is incorporated herein by reference in its entirety.

FIELD OF THE DISCLOSURE

The present disclosure relates generally to a training apparatus and method, and in particular to a wearable training apparatus and a training method for training a user to maintain constant visual focus on a moving target while physically reacting to the moving target, or alternatively, to maintain constant visual focus on a stationary target while performing controlled physical movements.

BACKGROUND

Many tasks require the practitioners to constantly maintain visual focus on moving target objects. For example, an ice-hockey goalie has to maintain visual focus on a fast-moving puck while it travels between multiple players during the play in order to successfully guard the net. It always requires significant effort to train a practitioner to learn how to controllably position their head and body while constantly maintaining visual focus on a moving target object.

Other tasks require practitioners to constantly maintain visual focus on stationary targets while controllably moving their bodies in reference to the stationary targets. For example, to successfully execute a golf swing that results in a desired flight of a struck ball, a golfer must maintain constant visual focus on the golf ball while controllably rotating their torso and hips coupled with coordinated arm movements during their back swing, and then maintaining the same constant visual focus when the direction of rotation and arm movements are reversed to strike the ball.

SUMMARY

Embodiments herein disclose a wearable training apparatus, a training system and related method for training a user to maintain constant visual focus on a moving or stationary target object for optimizing the user's physical performance in executing controlled and coordinated body movements in reference to the target object.

In some embodiments, the wearable training apparatus is in the form of a pair of eyeglasses or wearable goggles with a see-through area corresponding to a central portion of the field of vision (FOV) of human eyes.

In some embodiments, the wearable training apparatus comprises a vision-control assembly coupled to a head-mounting assembly. The vision-control assembly comprises a see-through area for allowing limited eye vision within a central portion of the user's FOV while concurrently blocking the user's peripheral vision. The head-mounting assembly comprises a mounting structure for mounting the wearable training apparatus onto the user's head.

In some embodiments, the vision-control assembly comprises a lens frame and one or two lens elements secured in the lens frame. The lens frame comprises a rearwardly extending sidewall about the one or two lens elements for blocking a peripheral portion of the human FOV. Each of the one or two lens elements comprises a transparent or see-through region, and the union of the one or two see-through regions form a see-through area configured for limiting a user's FOV to a reduced FOV that corresponds to a central portion of the human FOV, and an opaque area for blocking a peripheral portion of the user's FOV. Therefore, the training apparatus only allows see-through vision within the see-through area, and can force a user to maintain visual contact with a moving or stationary target object only within the central portion of the human FOV.

In some embodiments, the opaque area blocks at least a peripheral portion of the human FOV below the see-through area.

In some embodiments, the reduced FOV formed by the see-through area corresponds to a central portion of the human FOV about a gaze direction thereof.

In some embodiments, the reduced FOV formed by the see-through area encompasses at least a major portion of a natural binocular vision-area of the human FOV.

In some embodiments, the reduced FOV formed by the see-through area comprises a binocular vision-area encompassing at least a major portion of a natural area-of-focus of the human FOV.

In some embodiments, a training system may comprise one or more wearable training apparatuses as described above, and one or more imaging devices functionally coupled to one or more computing devices via one or more suitable wired or wireless connections. A user may wear a wearable training apparatus and practice a task such as playing golf or hockey or a racquet sport and the like. The imaging devices record images and/or video streams of the user in practice, and send the recorded images and/or video streams to the computing devices for playback and/or analysis.

The wearable training apparatus, training systems and related training methods disclosed herein may be used by various trainers such as program directors, coaches, and the like for training high-performance athletes, organized competitive amateur sports program practitioners, institutional sports program practitioners, recreational sports practitioners, workers, air traffic controllers, crane operators, heavy equipment operators, police officers, soldiers, military personnel, and the like, who require precise eye/hand/body coordinated decisions and movements and/or dexterity.

The wearable training apparatus, training systems and related training methods disclosed herein are suitable for training in any sports that require constant and focused visual tracking of moving or stationary objects while continuously executing physically coordinated reactions to the moving objects, for example such as in hockey, tennis, and golf. The wearable training apparatus, training systems, and related training methods disclosed herein are beneficial to both trainees and trainers. Athlete safety and workplace safety will improve as the trainees will learn how to reliably and reproducibly optimize their performance in physically responding to moving objects, thereby reducing risks of accidents and injuries.

By using the wearable training apparatus, training systems, and related training methods disclosed herein, recreational sports practitioners may see improved quality of life as their performance and skill levels will improve, for example by increasing skilled execution of contacting moving targets or stationary targets while executing controlled body movements. Teams using the herein-disclosed apparatus, systems and methods may improve their chances of winning their games.

By using the herein-disclosed apparatus, system, and method, high-performance athletes may achieve their optimum performance levels and have a better chance of being top performers in their sports areas.

The herein-disclosed apparatus, systems, and methods may also facilitate the rehabilitation of core muscles. By using the herein-disclosed apparatus, systems and methods, patients may learn to properly align their bodies in a stable position when given movement tasks during rehabilitation. An example may be any rehabilitation from a torso injury (such as hip/knee/shoulder/hernia injuries). The herein-disclosed apparatus, systems and methods can increase a patient's ability to regain motion by supporting their core area with minimal impacts to injured areas.

The herein-disclosed apparatus, systems and methods may also benefit brain injury patients as they retrain their bodies to move in a controlled manner.

The herein-disclosed apparatus, systems and methods may also be used in treating motion-related disorders.

By using the herein-disclosed apparatus, systems and methods, users may improve their sports performance and consequently improve their health and wellbeing, their social networks, and their sense of social connection.

According to one aspect of this disclosure, there is provided a wearable training apparatus. The wearable training apparatus comprises a vision-control assembly configured for coupling to a user's face about the user's eyes, said vision-control assembly comprising an opaque material and a see-through area surrounded by the opaque material at least on a temporal side, a nasal side, and an inferior side thereof. The opaque material is configured for substantially blocking the user's entire vision except at the see-through area; the see-through area is configured for forming a reduced field of vision (FOV) about a gaze direction; and the reduced FOV has a horizontal span encompassing at least a major portion of a natural binocular vision-area of the natural FOV of human eyes, said natural binocular vision-area being at the angular center of the natural FOV of human eyes.

In some embodiments, the horizontal span of the reduced FOV encompasses the entire natural binocular vision-area of the natural FOV of human eyes.

In some embodiments, the horizontal span of the reduced FOV further encompasses a minor portion of natural monocular vision-areas of the natural FOV of human eyes, said natural monocular vision-areas being peripheral to the natural binocular vision-area on respectively temporal sides.

In some embodiments, the horizontal span of the reduced FOV is about 120° with about 60° on each temporal side.

In some embodiments, the horizontal span of the reduced FOV is about 60° with about 30° on each temporal side.

In some embodiments, the horizontal span of the reduced FOV is about 80° to about 100° with about 40° to about 50° on each temporal side.

In some embodiments, the horizontal span of the reduced FOV is about 100° to about 140° with about 50° to about 70° on each temporal side.

In some embodiments, the horizontal span of the reduced FOV is about 110° to about 130° with about 55° to about 65° on each temporal side.

In some embodiments, the horizontal span of the reduced FOV comprises an adjusted binocular vision-area substantially encompassing a horizontal area-of-focus of the natural FOV of human eyes.

In some embodiments, the adjusted binocular vision-area has a horizontal span of about 40° to about 60° with about 20° to 30° on each temporal side.

In some embodiments, the adjusted binocular vision-area has a horizontal span of at least about 60° with at least about 30° on each temporal side.

In some embodiments, the adjusted binocular vision-area has a horizontal span of about 100° with about 50° on each temporal side.

In some embodiments, the adjusted binocular vision-area has a horizontal span about the same as that of the reduced FOV.

In some embodiments, the reduced FOV has a vertical span encompassing at least a major portion of a vertical area-of-focus of the natural FOV of human eyes.

In some embodiments, the vertical span of the reduced FOV is about 35° to about 75° with a superior span of about 15° to about 35° and an inferior span of about 20° to about 40°.

In some embodiments, the vertical span of the reduced FOV is about 55° with a superior span of about 25° and an inferior span of about 30°.

In some embodiments, the vertical span of the reduced FOV is about 35° to about 75° with a superior span of about 15° to about 35° and an inferior span of about 20° to about 40°.

In some embodiments, the vertical span of the reduced FOV is about 80° to about 100° with a superior span of about 60° and an inferior span of about 20° to about 40°.

In some embodiments, the vertical span of the reduced FOV is about 90° with a superior span of about 60° and an inferior span of about 30°.

In some embodiments, the see-through area is surrounded by the opaque material only on the temporal side, the nasal side, and the inferior side thereof.

In some embodiments, the see-through area extends to a top of the vision-control assembly.

In some embodiments, the opaque material comprises one or more first ventilation holes.

In some embodiments, the vision-control assembly comprises a rear-extending opaque sidewall about at least the temporal side, the nasal side, and the inferior side of the see-through area.

In some embodiments, the sidewall is made of a soft material.

In some embodiments, the sidewall comprises a plurality of second ventilation holes.

In some embodiments, the see-through area comprises two see-through regions about the user's eyes and separated by a portion of the opaque material.

In some embodiments, the vision-control assembly comprises a transparent material covering the see-through area.

In some embodiments, the transparent material comprises one or more lens.

In some embodiments, the vision-control assembly comprises a transparent material, a first portion of the transparent material covering the see-through area and a second portion of the transparent material being rendered opaque.

In some embodiments, the second portion of the transparent material is rendered opaque by gluing, staining, painting, or coupling thereto a layer of opaque material.

In some embodiments, the wearable training apparatus further comprises a coupling structure for coupling the wearable training apparatus to a pair of eyeglasses.

In some embodiments, the wearable training apparatus further comprises a head-mounting assembly coupled to the vision-control assembly for coupling the vision-control assembly to the user's face.

In some embodiments, the head-mounting assembly comprises a flexible band.

In some embodiments, the head-mounting assembly comprises a pair of temple pieces.

According to one aspect of this disclosure, there is provided a system for training a user. The system comprises a wearable training apparatus disclosed herein for being worn by the user; at least one imaging device configured for capturing images of the user wearing the wearable training apparatus; and at least one computing device in communication with the one or more imaging devices for tracking the user's motion using the at least one imaging device.

According to one aspect of this disclosure, there is provided a wearable training apparatus. The wearable training apparatus comprises: a vision-control assembly configured for engaging a user's face about the user's eyes, said vision-control assembly comprising a lens frame having a see-through area about the user's eyes and an opaque area surrounding the see-through area at least on a temporal side, a nasal side, and an inferior side thereof. The opaque area is configured for substantially blocking the user's entire vision except at the see-through area; the see-through area is configured for forming a reduced field of vision (FOV) about a gaze direction; and the reduced FOV has a horizontal span encompassing at least a major portion of a natural binocular vision-area of a natural FOV of human eyes, said natural binocular vision-area being at an angular center of the natural FOV of human eyes.

In some embodiments, the wearable training apparatus further comprises a headgear; wherein the vision-control assembly is attached to the headgear.

In some embodiments, the headgear comprises a helmet body with a front opening about the user's eyes and a protective fence covering the front opening; and wherein the vision-control assembly is attached to inside the helmet body.

In some embodiments, the headgear comprises a helmet body with a front opening about the user's eyes and a protective fence covering the front opening; and wherein the vision-control assembly is attached between the helmet body and the protective fence.

In some embodiments, the wearable training apparatus further comprises: a display on an inner side of the lens frame overlapping with at least one of the see-through area and the opaque area; and a control circuitry functionally coupled to the display for controlling the displaying of the display.

In some embodiments, the wearable training apparatus further comprises: at least one imaging device coupled to the lens frame.

In some embodiments, the lens frame comprises at least one see-through display, said see-though display is configured for rendering a central portion thereof see-through for forming said see-through area and for displaying a dark color in a peripheral portion thereof surrounding the see-through area for forming said opaque area.

In some embodiments, the wearable training apparatus further comprises: an input component; a control circuitry functionally coupled to the input component and the at least one see-through display; the control circuitry configured for receiving user input from the input component and adjusting the size and position of the see-through area of the see-through display based on received user input.

BRIEF DESCRIPTION OF THE DRAWINGS

FIG. 33 is a schematic diagram of a training system, according to still another embodiment;

FIG. 34A is a perspective view of a wearable training apparatus having a helmet with a protective fence and a vision-control assembly, according to some embodiments of this disclosure, wherein the vision-control assembly is coupled to an inner side of the helmet;

FIG. 34B is a perspective view of the wearable training apparatus shown in FIG. 34A without the protective fence;

FIGS. 37 to 39 show a wearable training apparatus, according to some embodiments of this disclosure, wherein FIG. 37 is a perspective view of the wearable training apparatus viewed from a front angle, FIG. 38 is a perspective view of the wearable training apparatus viewed from a rear angle, and FIG. 39 is a rear view of the wearable training apparatus;

DETAILED DESCRIPTION

Figure 1:
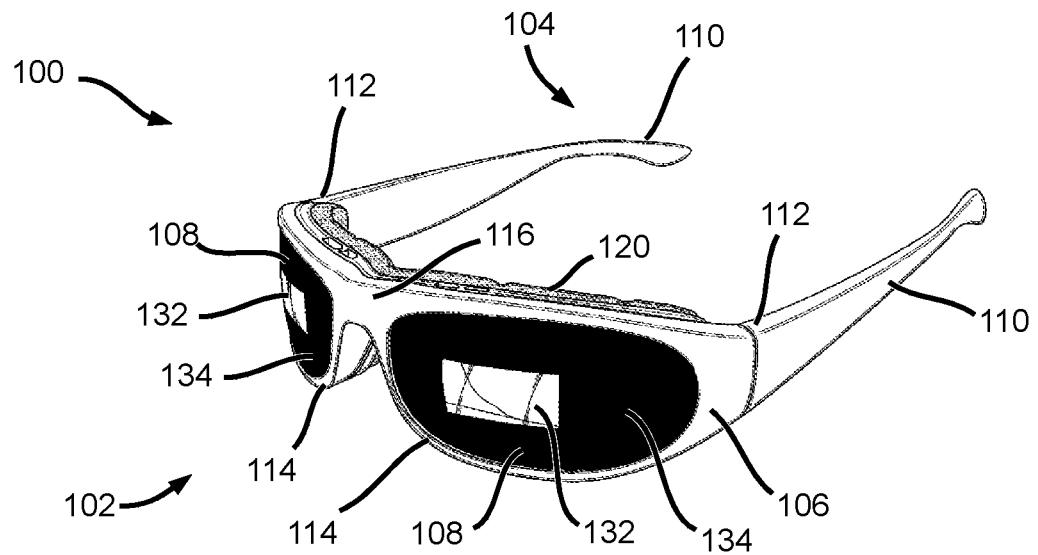
FIG. 1 is a front perspective view of a wearable training apparatus viewed from a front-viewing angle, according to one embodiment of this disclosure.
Figure 2:
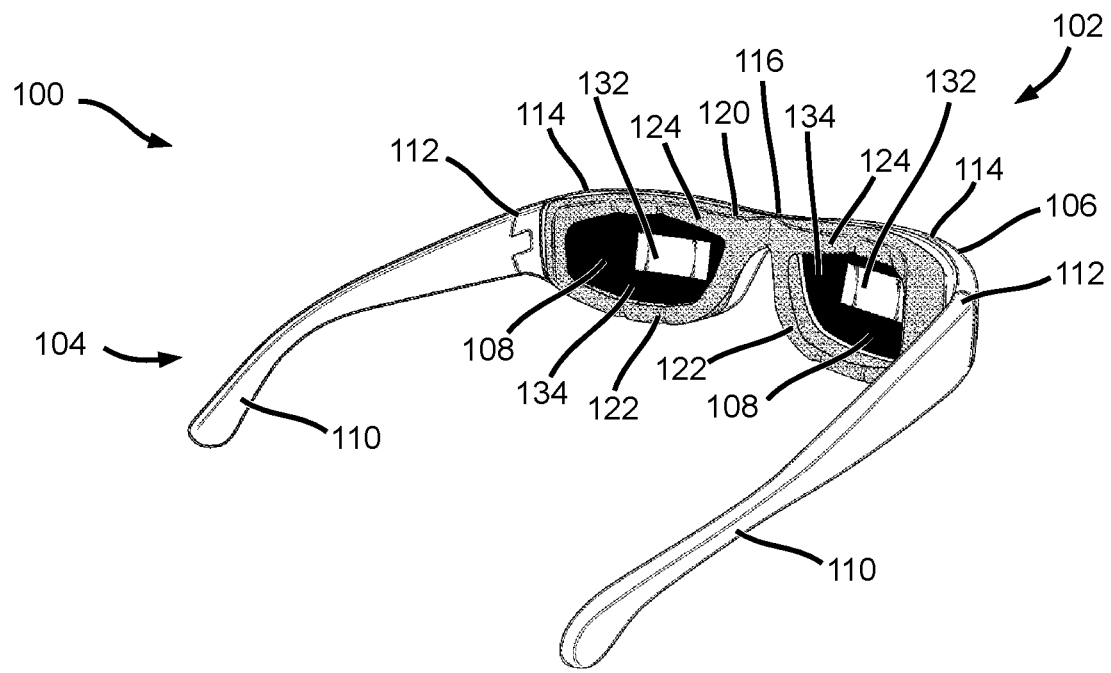
FIG. 2 is a rear perspective view of the wearable training apparatus shown in FIG. 1 viewed from a rear-viewing angle.

The embodiments disclosed herein relate to an apparatus and a system for training a user to constantly focus on a moving object or a stationary target object and for improving the user's physical performance in executing controlled and coordinated body movements in reference to the target object.

Turning now to FIGS. 1 to 8, a wearable training apparatus is shown and is generally identified using the reference numeral 100. The wearable training apparatus 100 is in the form of a pair of wearable eyeglasses and comprises a vision-control assembly 102 and a head-mounting assembly 104.

The vision-control assembly 102 is configured for coupling to a user's face about the user's eyes and comprises a lens frame 106, a pair of lens elements 108 secured in or otherwise coupled to the lens frame 106. The head-mounting assembly 104 comprises a pair of side arms or temple pieces 110, each coupled to a respective side of the frame 106. In this embodiment, each temple piece 110 is pivotable about a hinge (not shown) at a proximal end 112 thereof. Those skilled in the art will appreciate that, in an alternative embodiment, the temple pieces 110 may be integrated with or otherwise fixed to the lens frame 106 and may not be pivotable.

The lens frame 106 is made of a suitable material such as rigid plastic, a resilient plastic, metal, and the like. The lens frame 106 in this embodiment comprises two frame sections 114 each receiving therein a lens element 108. A frame connector 116 forms a nose piece and connects the two frame sections 114.

The lens frame 106 also comprises a sidewall 120 extending rearwardly therefrom. The sidewall 120 is made of a soft material such as a fabric-wrapped sponge, rubber, and/or the like, and comprises an end surface 124 for contacting a user's face about the user's eyes to block the user's side vision. As shown in FIGS. 1 to 8, the sidewall 120 in this embodiment has a similar profile as that of the lens frame 102, and comprises two wall sections 122, each extending rearwardly from a respective frame section 112 about a respective lens element 104.

In this embodiment, the sidewall 120 has a suitable rearward-extension depth and/or the temple pieces 110 are have a suitable configuration such that a user may wear the wearable training apparatus 100 in a manner similar to wearing a pair of regular eyeglasses and the end surface 124 of the sidewall 120 comfortably in contact with the user's face blocking the user's side vision. As known in the art, when worn by a user, the vertex distance of a pair of regular eyeglasses, i.e., the distance between the back surface of a lens of eyeglasses (spectacles), and the front of the cornea, is usually about 12 millimeters (mm) to about 14 mm.

Unlike the lens elements of conventional glasses that are generally entirely transparent or "see-through" for minimizing the blockage of user's vision, each lens element 104 in this embodiment comprises a central aperture or transparent region 132 for "see-through", and a surrounding, substantive opaque area 134 for blocking a user's peripheral vision. The central aperture 132 may be an opening or alternatively, may be made of a suitable transparent material. Herein, the terms "transparent" and "see-through" refer to the optical characteristics of the central aperture or transparent region 132 that allows a user's eye therebehind to observe objects in front thereof within a field of vision (FOV; also called visual field). In various embodiments, the transparent material used herein may be a clear material or alternatively, have one or more transparent shading colors. In some embodiments, the transparent material may also have the optical characteristics suitable for vision correction such as for alleviating nearsightedness, farsightedness, or astigmatism.

The opaque area 134 of each lens element 104 is made of an opaque material. Alternatively, the opaque area 134 may be rendered opaque by gluing, staining, painting, or otherwise coupling thereto a layer of opaque material.

Figure 3A:
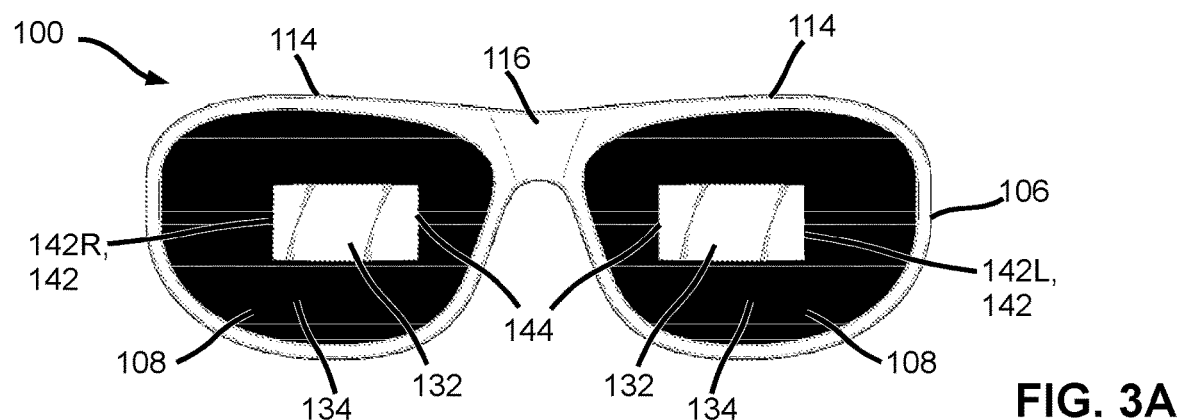
FIG. 3A is a front view of the wearable training apparatus shown in FIG. 1.
Figure 3B:
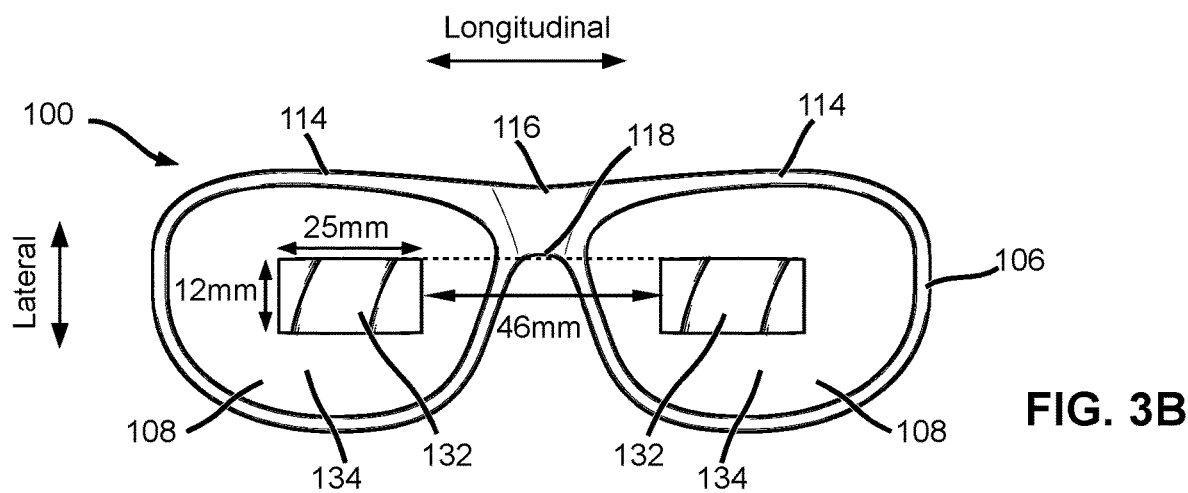
FIG. 3B is a front view of the wearable training apparatus shown in FIG. 1, showing the dimension of the transparent regions thereof.
Figure 4:
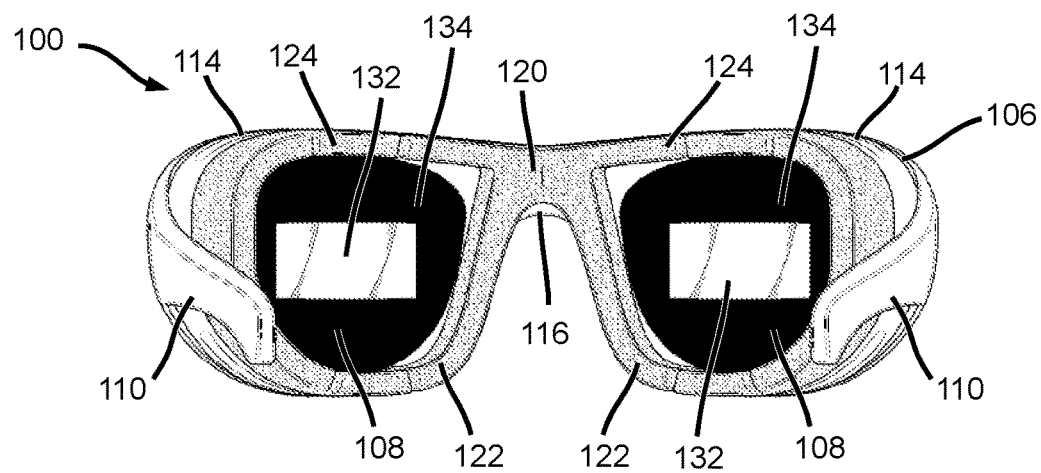
FIG. 4 is a rear view of the wearable training apparatus shown in FIG. 1.
Figure 5:
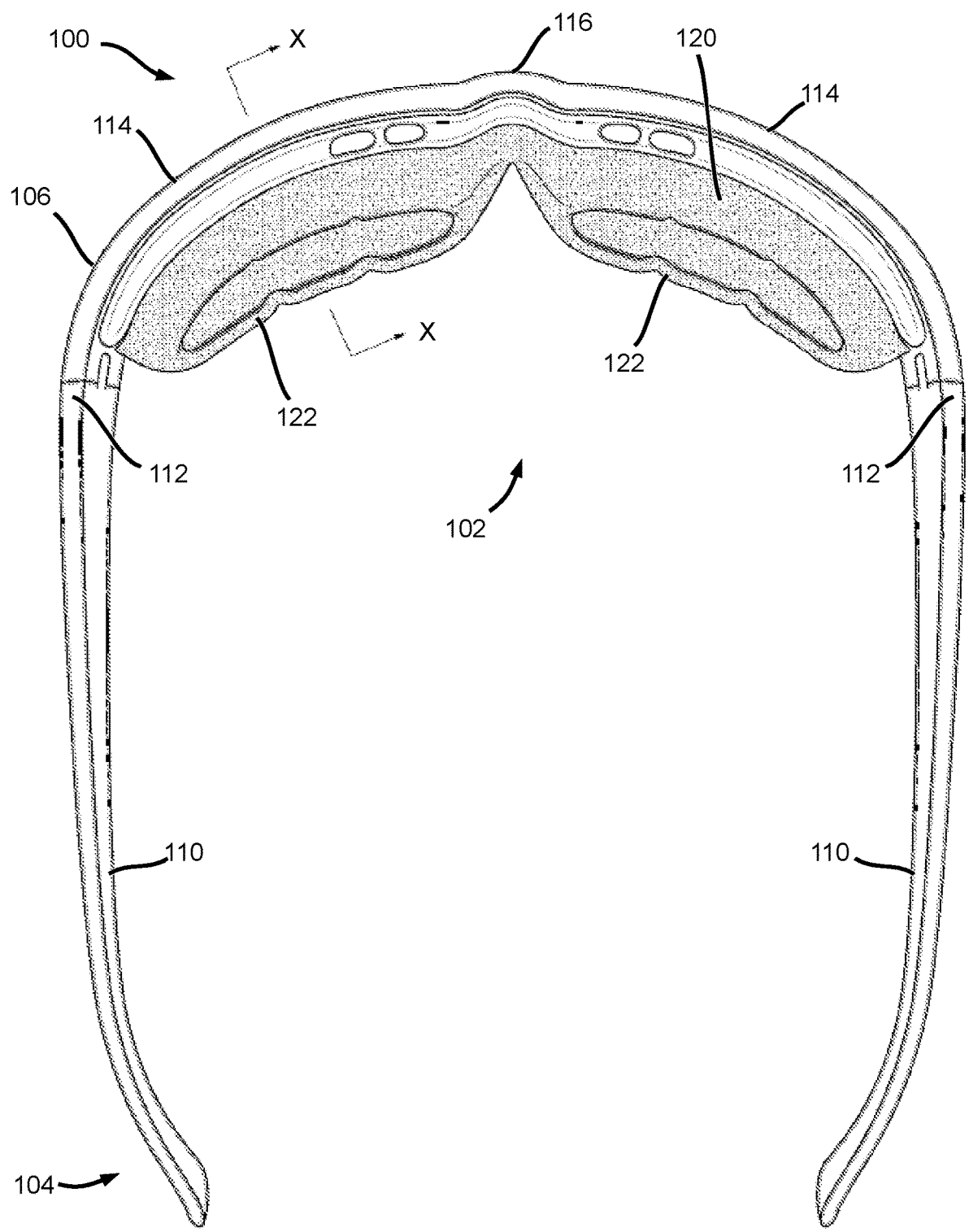
FIG. 5 is a plan view of the wearable training apparatus shown in FIG. 1.
Figure 6:
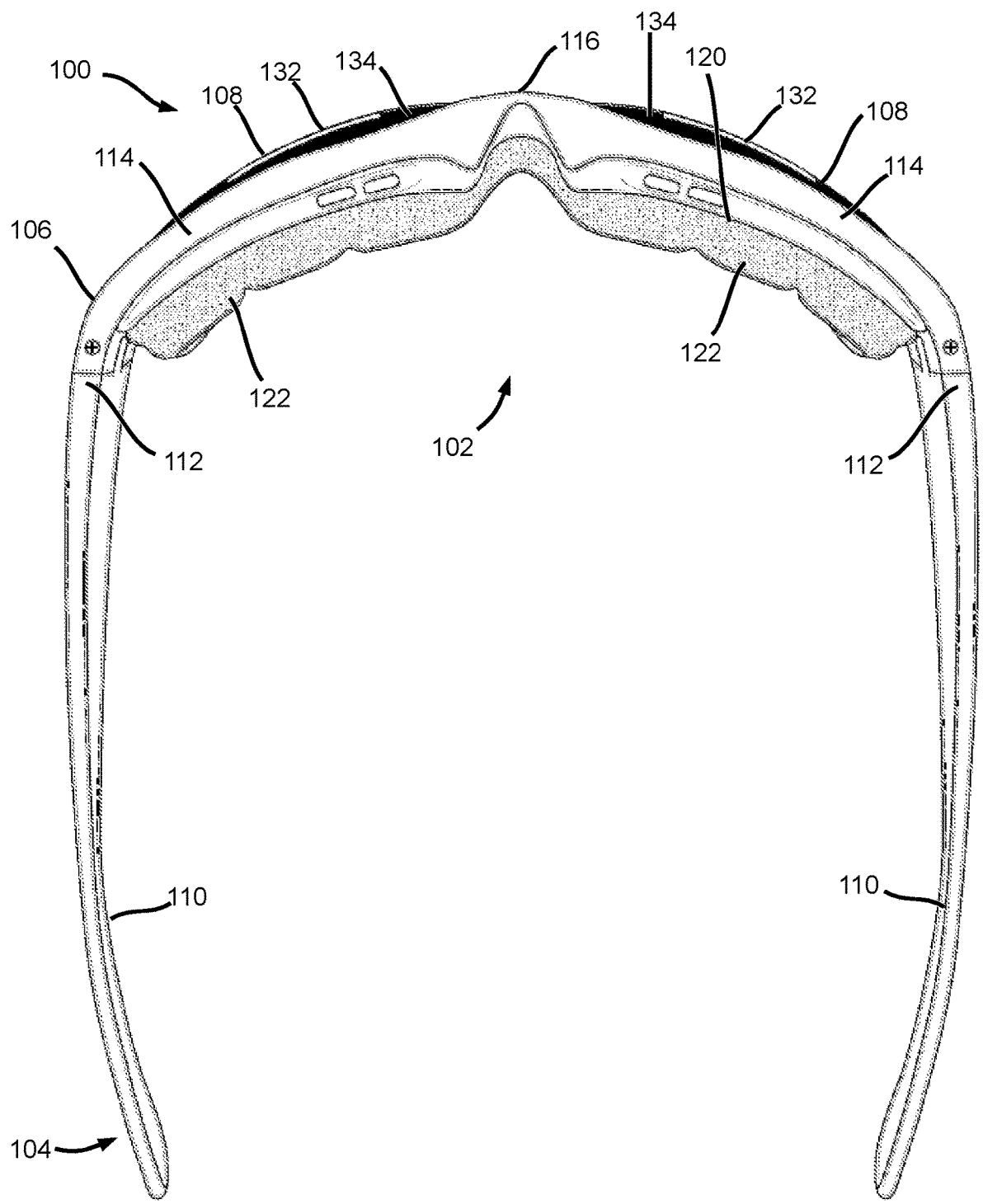
FIG. 6 is a bottom view of the wearable training apparatus shown in FIG. 1.
Figure 7:
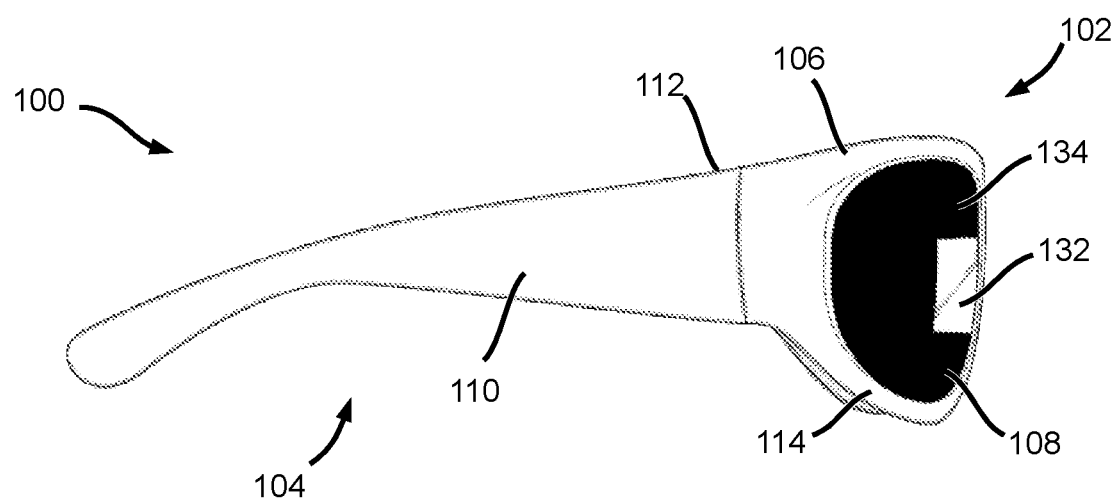
FIG. 7 is a side view of the wearable training apparatus shown in FIG. 1.
Figure 8:
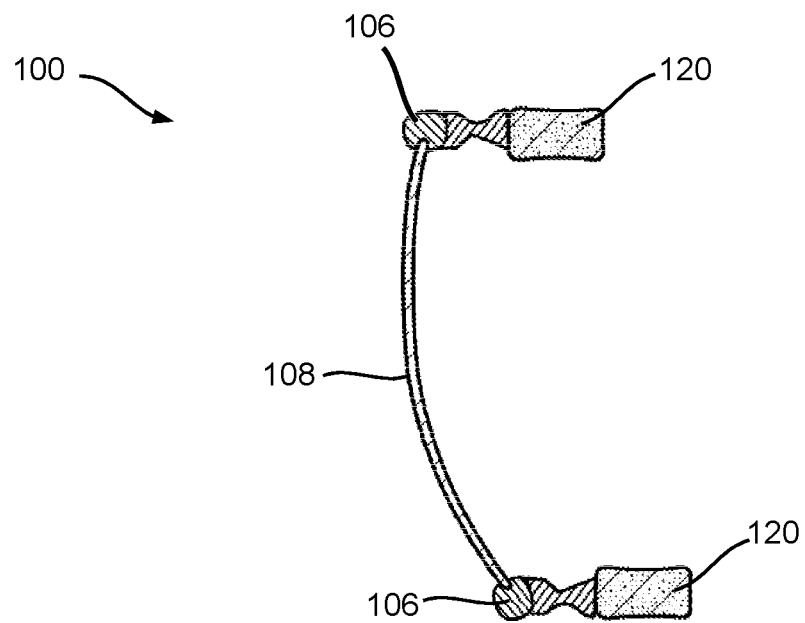
FIG. 8 is a cross-sectional view of the wearable training apparatus along the section line X-X shown in FIG. 5.

The central transparent region 132 of each lens element 104 is located in front of a central vision-area of the respective eye of the user, and may not necessarily be located at the geometrical center of the lens element 104. As shown in FIG. 3B, in this embodiment, each central transparent region 132 has a rectangular shape with a dimension of about 12 millimeters (mm) along a lateral direction by about 25 mm along a longitudinal direction. The two central transparent regions 132 are at a distance of about 46 mm measured from the nasal edges (towards the nose) thereof. The top of the two central transparent regions 132 are substantially flush with or slightly below the nose bridge 118.

As will be described in more detail later, when worn by a user, the wearable training apparatus 100 blocks at least a portion of a peripheral vision-area of the user's eyes to force the user to focus on one or more targets directly in front of a central area.

As defined in book entitled "Clinical Methods: The History, Physical, and Laboratory Examinations. 3rd edition," by H Kenneth Walker, W Dallas Hall, and J Willis Hurst, published by Butterworths, 1990, "the field of vision is that portion of space in which objects are visible at the same moment during steady fixation of gaze in one direction." In other words, the visual field or field of vision (FOV) of an eye or both eyes is the total area that can be seen when the eye or eyes are focused forward on a fixation point (i.e., the point at which the person's gaze is directed). For ease of description, a reference line between each eye and a fixation point at a sufficient distance is denoted as a gaze direction and is used for describing the FOV of human eyes.

Figure 9A:
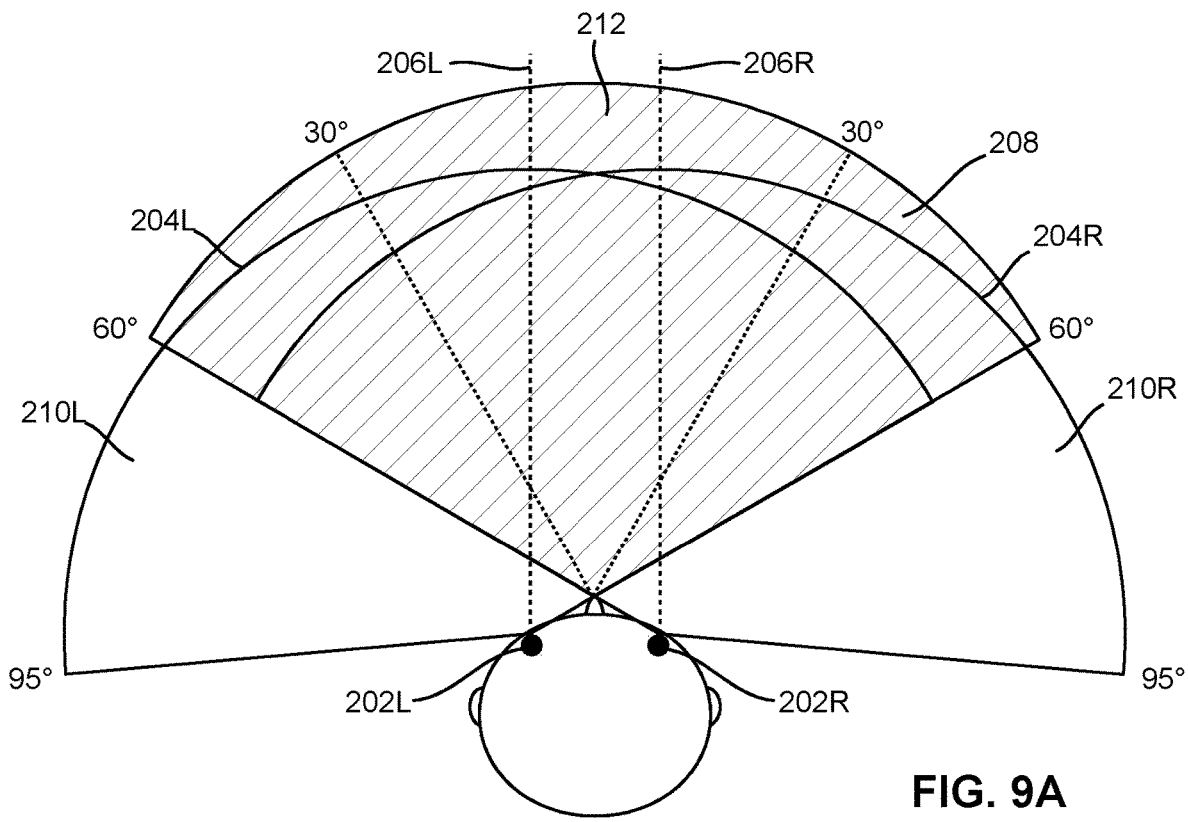
FIG. 9A is a schematic diagram showing the horizontal angular-span of the natural field of vision (FOV) of a pair of human eyes.

FIG. 9A is a schematic diagram showing the horizontal angular-span of the natural (i.e., unblocked) FOV of a pair of human eyes 202L and 202R (collectively denoted as 202). Each eye 202L, 202R has a horizontal FOV span 204L, 204R of about 95° temporally (i.e., outwardly towards the temple) with respect to a gaze direction 206L, 206R, and of about 60° nasally (i.e., inwardly toward the nose) with respect to the gaze direction 206L, 206R, giving rise to a combined horizontal span of natural FOV of about 190° to about 220°.

The combined horizontal FOV may be partitioned to a central portion 208 (denoted as a natural binocular vision-area) with an angular span of about 120° (i.e., 60° on each side) visible to both eyes 202L and 202R and two side portions 210L and 201R (denoted as natural monocular vision-areas) only visible to one eye 202L, 202R, respectively.

The natural binocular vision-area 208 is important as the person may obtain depth information of objects therein. A central portion 212 of the natural binocular vision-area 208 having an angular span of about 60° (i.e., 30° on each side) is a horizontal area-of-focus.

Figure 9B:
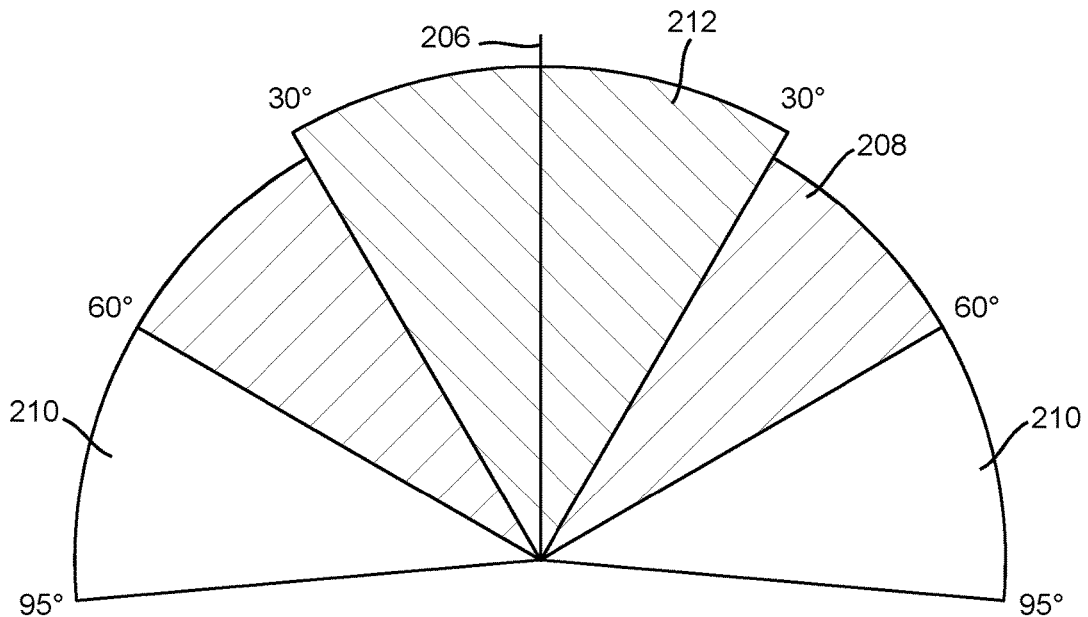
FIG. 9B is a simplified schematic diagram of FIG. 9A, showing the horizontal angular-span of the natural FOV of the pair of human eyes.

The wearable training apparatus 100 disclosed herein is for training users to focus on moving or stationary targets at a distance (such as at a distance of one (1) meter or further). Therefore, the natural FOV of human eyes may be simplified as shown in FIG. 9B.

The vision accuracy is most accurate in the horizontal area-of-focus 212, and gradually degrades towards the two temporal sides with the monocular vision-areas 210L and 201R being the least accurate vision-areas.

Figure 10:
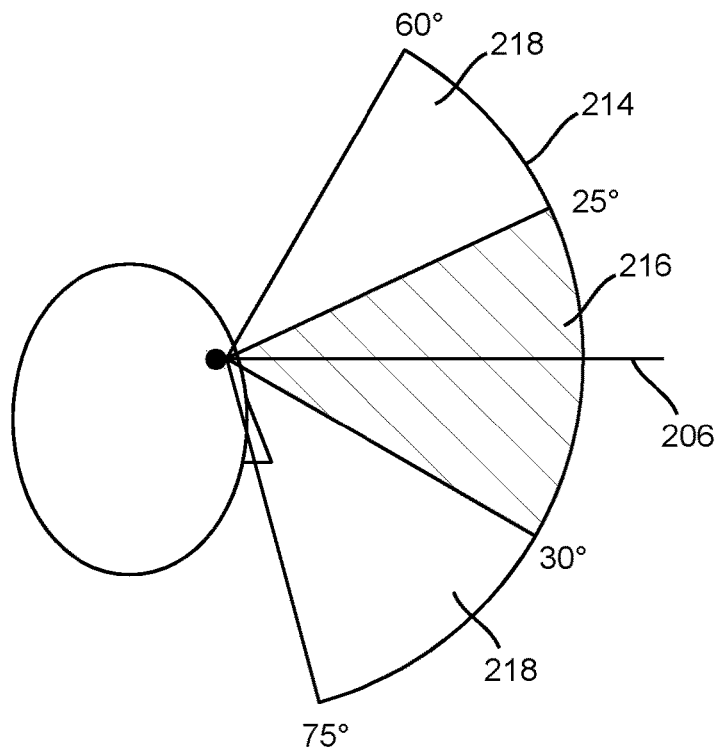
FIG. 10 is a schematic diagram showing the vertical angular-span of the natural FOV of the pair of human eyes.

FIG. 10 is a schematic diagram showing the vertical angular-span of the natural FOV of human eyes 202. As shown, the vertical span 214 of the natural FOV of a person's eyes is about 60° superiorly (i.e., upwardly) and about 70° inferiorly (i.e., downwardly) with respect to the gaze direction 206, thereby giving rise to a combined vertical span of natural FOV of about 130° to about 135°. The vertical span of natural FOV may be partitioned into a central portion 216 as a vertical area-of-focus and two vertical peripheral vision-areas 218 respectively above and below the area-of-focus 216.

Similarly, the vision accuracy is most accurate in the vertical area-of-focus 216, and gradually degrades towards the superior and inferior sides.

In many human activities, it is generally preferable to visually focus on moving or stationary targets in the more accurate vision-area than in the less accurate vision-area. However, objects in less accurate vision-areas such as the monocular vision-areas 210L and 201R and the vertical peripheral vision-areas 218 may distract a person's attention or focus during their activities.

On the other hand, it is also generally preferable to have a sufficiently large visual field to allow the person sensing the environment around the moving targets or stationary targets, for better target-tracking and better decision making.

Therefore, in various embodiments, the wearable training apparatus 100 may comprise a see-through area (including the transparent regions 132) and a vision-blocking area (including the opaque area 134 and the sidewall 120). The see-through area is sized and positioned to allow a user to see through the wearable training apparatus 100 within a reduced FOV area about the gaze direction 206, and the vision-blocking area blocks the user's unwanted FOV areas peripheral to the reduced FOV area. In this way, the wearable training apparatus 100 provides a focused vision (to exclude distractions) with a sufficiently large visual field (to provide sufficient environmental context). In a training event, the wearable training apparatus 100 may help a user thereof to move his/her head and body to position one or more target objects into the reduced FOV area, thereby training the user to move his/her head and body to position one or more target objects into the more accurate vision-areas even without wearing the wearable training apparatus 100 in activities. The sizes of the reduced FOV area and the binocular vision-area thereof (denoted as an adjusted binocular vision-area; described in more detail later) are important for these purposes.

Figure 11A:
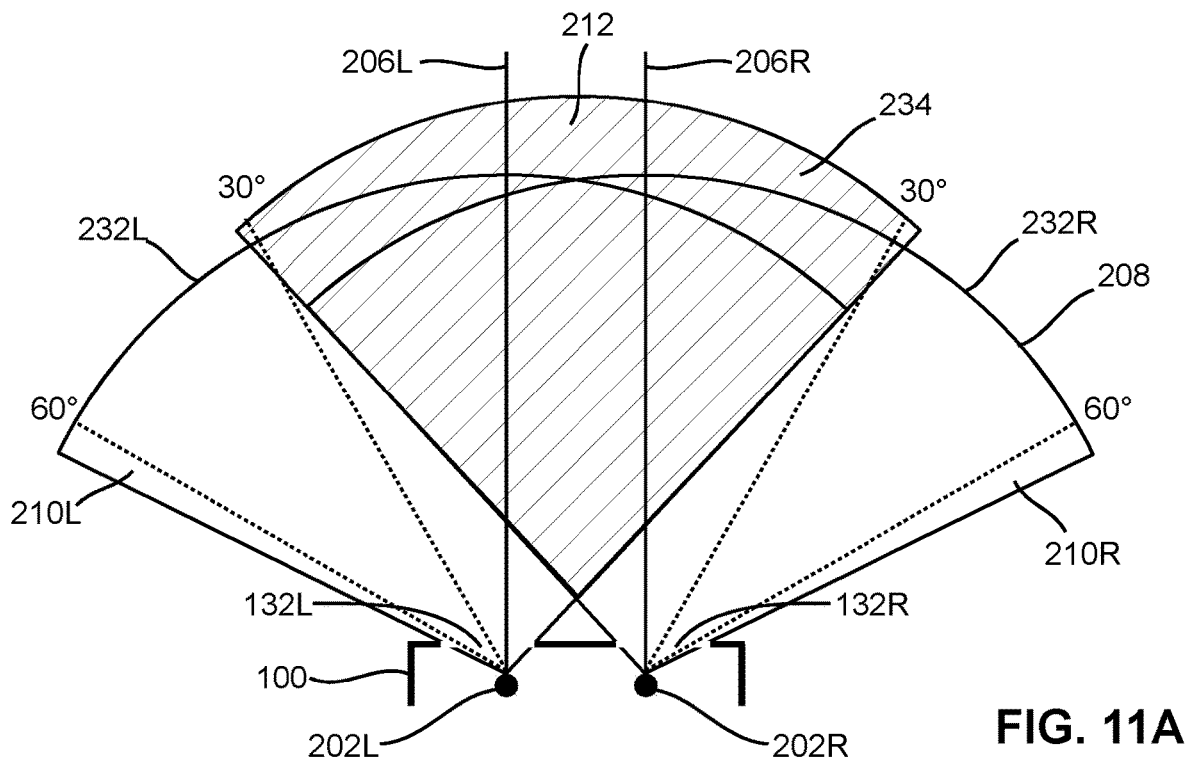
FIGS. 11A to 11C are schematic diagrams showing the horizontal spans of a reduced FOV area of the pair of human eyes after wearing the wearable training apparatus shown in FIG. 1, and an adjusted binocular vision-area of the reduced FOV area.
Figure 11B:
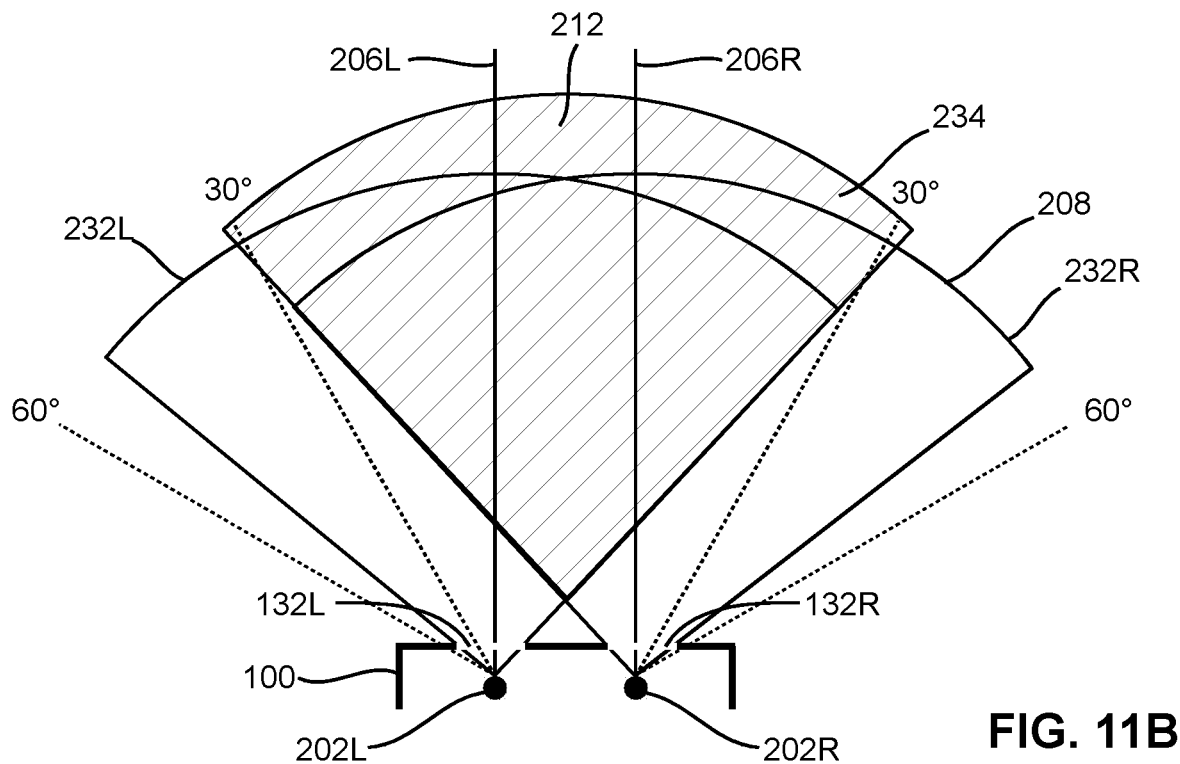
Figure 11C:
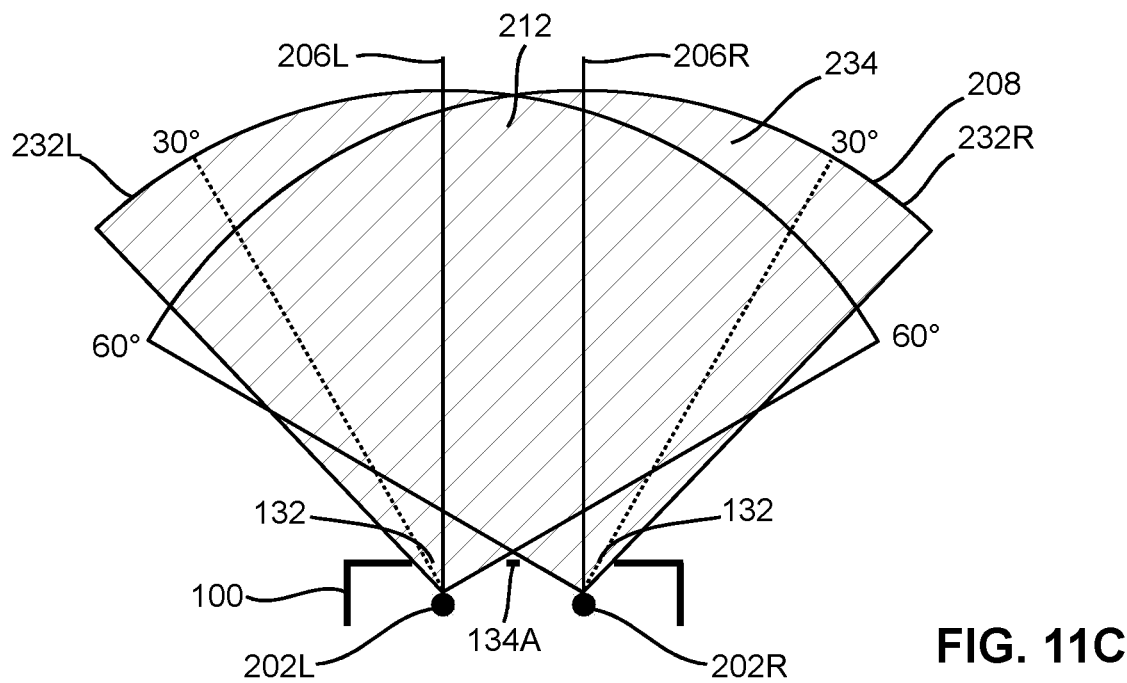

As shown in FIGS. 11A to 11C, the horizontal spans of the reduced FOV area and the adjusted binocular vision-area of the reduced FOV area are determined by the temporal and nasal edges of the transparent regions 132 (i.e., the outer and inner edges thereof towards the temples and the nose, respectively).

FIG. 11A is a schematic plan view showing a user wearing the wearable training apparatus 100 and the horizontal span of the FOV in some embodiments. The temporal edge of each transparent region 132L/132R limits the temporal span of the corresponding eye 202L/202R to an angle slightly larger than 60° and the nasal edge thereof limits the nasal span of the corresponding eye 202L/202R to an angle smaller than 60°.

Thus, the wearable training apparatus 100 provides a reduced FOV with a horizontal span 232 being the union of the horizontal spans 232L and 232R of the left and right transparent regions 132L and 132R, resulting in a horizontal span slightly greater than 120°. The reduced FOV encompasses the 120° natural binocular vision-area 208 and minor portions of the natural monocular vision-areas 210L and 210R on the nasal sides thereof. The major portions of the natural monocular vision-areas 210L and 210R on the temporal sides thereof are blocked.

The reduced FOV shown in FIG. 11A has a binocular area 234 determined by the nasal edges of the transparent regions 132L and 132R and substantially encompasses the 60° horizontal area-of-focus 212. In these embodiments, the binocular area 234 is substantially smaller than the horizontal span 232 of the reduced FOV.

FIG. 11B is a schematic plan view showing a user wearing the wearable training apparatus 100 and the horizontal span of the FOV in some other embodiments. The temporal edge of each transparent region 132L/132R limits the temporal span of the corresponding eye 202L/202R to an angle slightly smaller than 60° and the nasal edge thereof limits the nasal span of the corresponding eye 202L/202R to an angle smaller than 60°.

Thus, the reduced FOV of the wearable training apparatus 100 has a horizontal span 232 slightly smaller than 120° and encompassing a major portion of the 120° natural binocular vision-area 208. A small portion of the natural binocular vision-area 208 on the temporal sides thereof and the natural monocular vision-areas 210L and 210R are blocked.

The reduced FOV shown in FIG. 11B has a binocular area 234 determined by the nasal edges of the transparent regions 132L and 132R and substantially encompasses the 60° horizontal area-of-focus 212. In these embodiments, the binocular area 234 is substantially smaller than the horizontal span 232.

FIG. 11C is a schematic plan view showing a user wearing the wearable training apparatus 100 and the horizontal span of the FOV in yet some other embodiments. The temporal edge of each transparent region 132L/132R limits the temporal span of the corresponding eye 202L/202R to an angle slightly smaller than 60°. However, the two transparent regions 132L and 132R is separated by a sufficiently small opaque area 134A or there is no opaque area 134A therebetween such that the nasal edges of the transparent regions 132L and 132R does not limit the nasal span of the corresponding eye 202L/202R, thereby resulting in a nasal span of about 60°.

Thus, the reduced FOV of the wearable training apparatus 100 has a horizontal span 232 of about 120° (i.e., equal to the 120° natural binocular vision-area 208). The natural monocular vision-areas 210L and 210R are blocked.

The reduced FOV shown in FIG. 11C has a binocular area 234 determined by the temporal edges of the transparent regions 132L and 132R and substantially encompasses the 60° horizontal area-of-focus 212. In these embodiments, the binocular area 234 is substantially the same as the horizontal span 232.

Figure 12A:
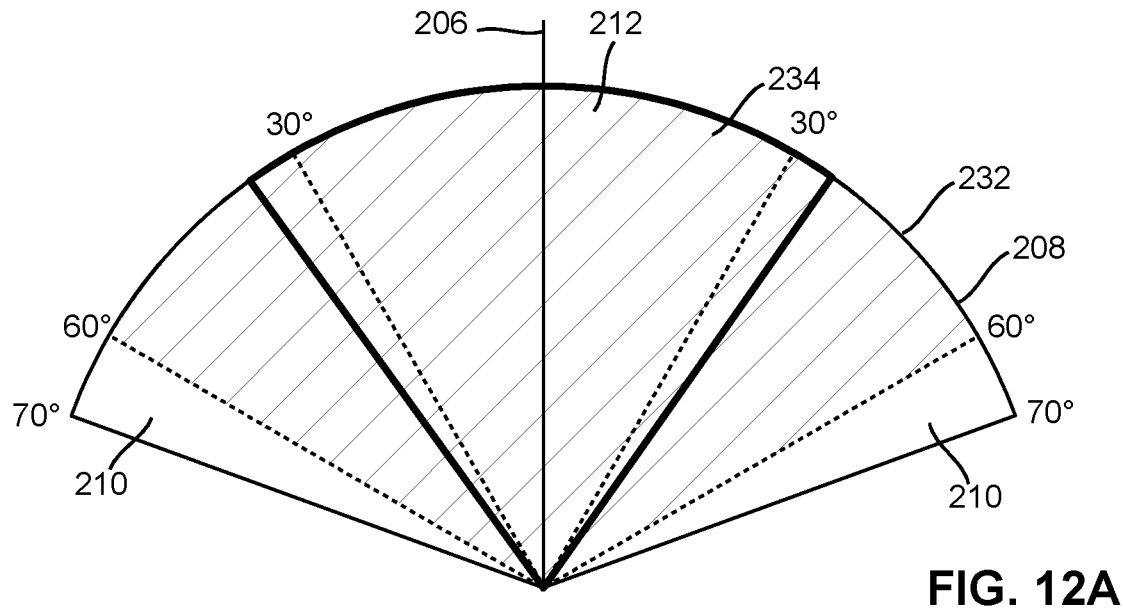
FIGS. 12A and 12B are simplified schematic diagrams showing the horizontal spans of a reduced FOV area of the pair of human eyes after wearing the wearable training apparatus shown in FIG. 1, and an adjusted binocular vision-area of the reduced FOV area.
Figure 12B:
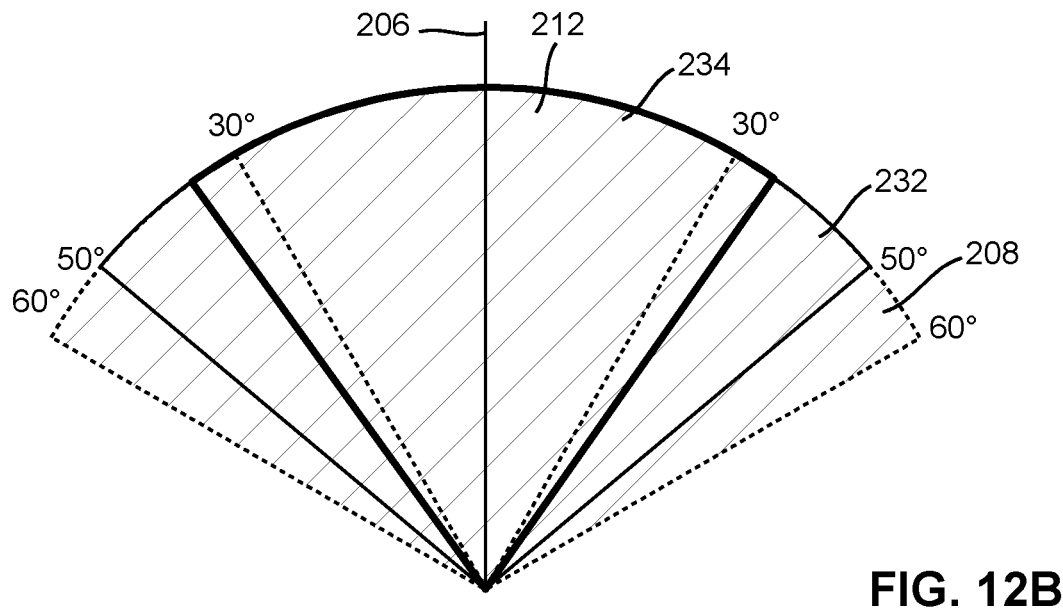

The reduced FOV and the binocular area thereof may be simplified as shown in FIGS. 12A and 12B. In various embodiments, the horizontal span 232 of the reduced FOV substantially may encompass at least a major portion of the natural binocular vision-area, may exclude at least a major portion of the monocular vision-areas, and may have a binocular area 234 substantially encompassing the horizontal area-of-focus 212.

The wearable training apparatus 100 thus limits a user's FOV to a vision-area about the gaze direction 206 and having about 60° angular span.

In some embodiments, the horizontal span 232 of the reduced FOV may be about 60° (i.e., about 30° on each temporal side). In some embodiments, the horizontal span 232 of the reduced FOV may be about 80° to about 100° (i.e., about 40° to about 50° on each temporal side). In some embodiments, the horizontal span 232 of the reduced FOV may be about 100° to about 140° (i.e., about 50° to about 70° on each temporal side). In some embodiments, the horizontal span 232 of the reduced FOV may be about 110° to about 130° (i.e., about 55° to about 65° on each temporal side). In some embodiments, the horizontal span 232 of the reduced FOV may be about 120° (i.e., about 60° on each temporal side).

In some embodiments, the adjusted binocular vision-area 234 of the reduced FOV has a horizontal span of at least about 40° (i.e., about 20° or greater on each temporal side). In some embodiments, the adjusted binocular vision-area 234 of the reduced FOV has a horizontal span of at least about 60° (i.e., about 30° or greater on each temporal side). In some embodiments, the adjusted binocular vision-area 234 of the reduced FOV has a horizontal span of about 100° (i.e., about 50° or greater on each temporal side). In some embodiments, the adjusted binocular vision-area 234 of the reduced FOV has a horizontal span substantially the same as the horizontal span 232 thereof.

In various embodiments, the reduced FOV of the wearable training apparatus 100 may have a reduced vertical span (determined by the upper and lower edges of the transparent regions 132) encompassing at least a major portion of the vertical area-of-focus 216 and excluding at least a major portion of the vertical peripheral vision-areas 218.

Figure 13A:
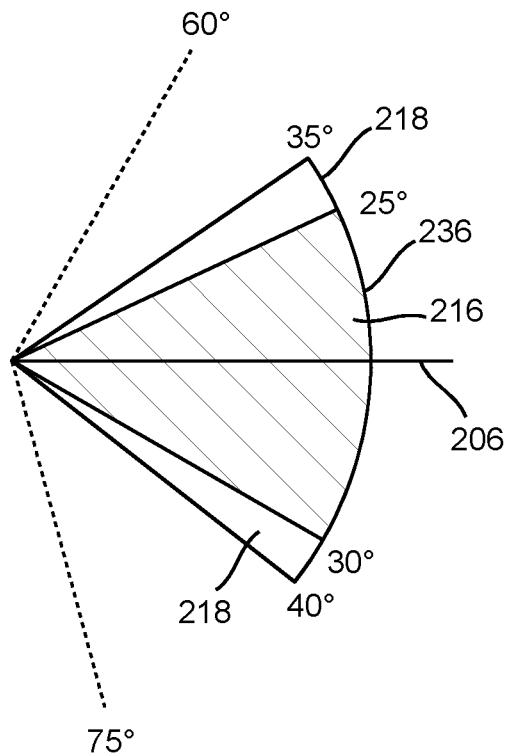
FIGS. 13A and 13B are schematic diagrams showing the reduced vertical FOV of the pair of human eyes after wearing the wearable training apparatus shown in FIG. 1.

For example, in the embodiments shown in FIG. 13A, the reduced FOV of the wearable training apparatus 100 may have a vertical span of about 35° to about 75° with a superior span of about 15° to about 35° and an inferior span of about 20° to about 40°.

In some embodiments, the reduced FOV of the wearable training apparatus 100 may have a vertical span of about 55° with a superior span of about 25° and an inferior span of about 30°.

Figure 13B:
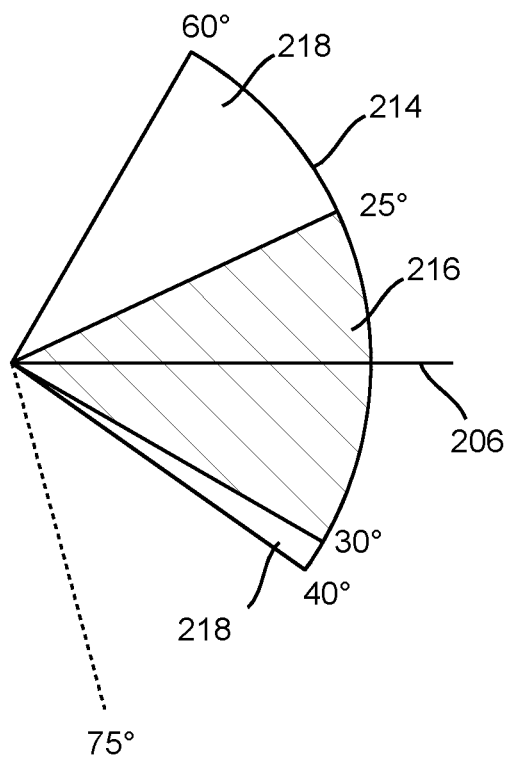
Figure 14:
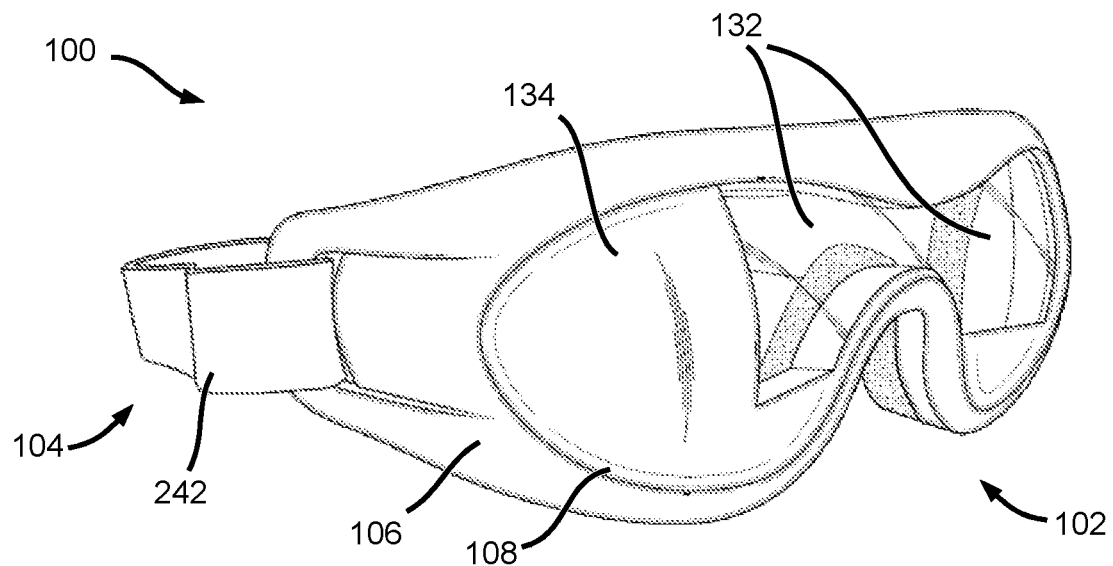
FIG. 14 is a front perspective view of a training apparatus viewed from a front-viewing angle, according to an alternative embodiment of this disclosure.
Figure 15:
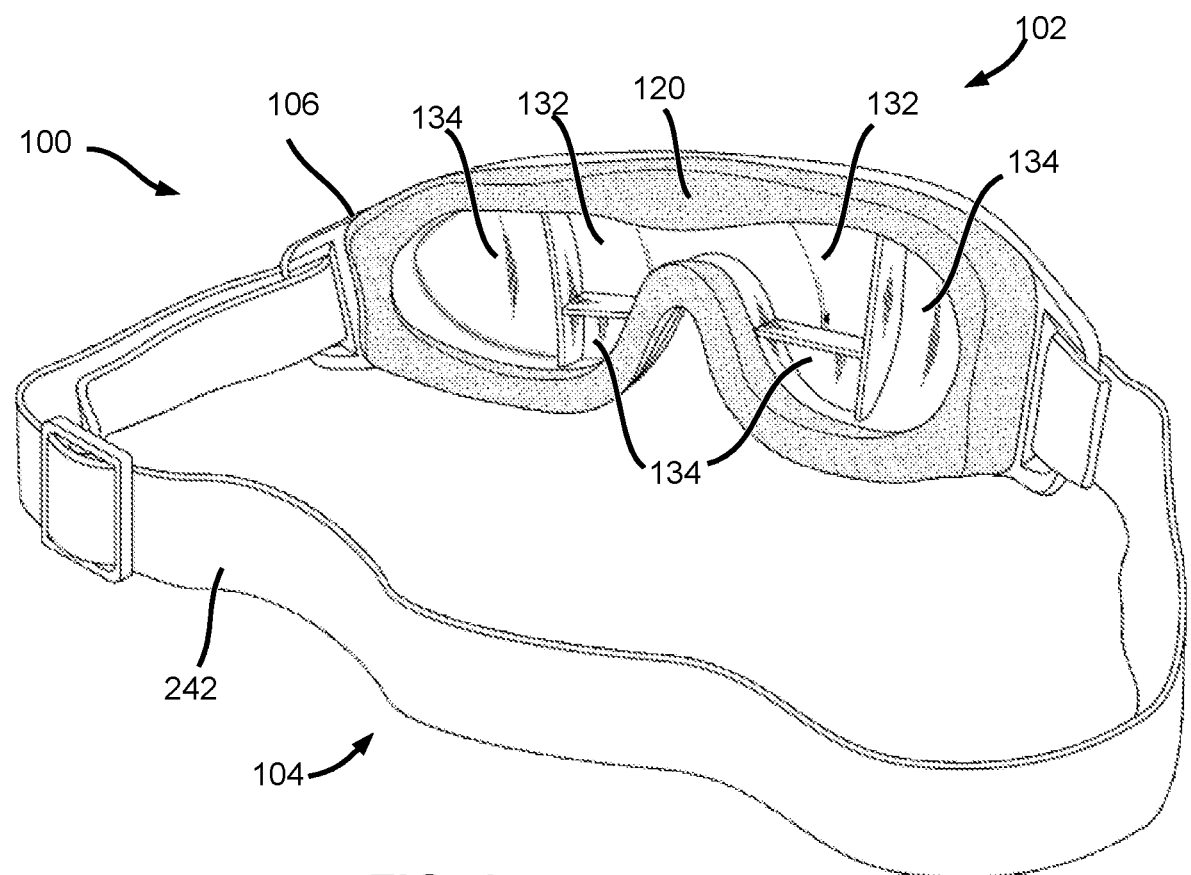
FIG. 15 is a rear perspective view of the training apparatus shown in FIG. 11 viewed from a rear-viewing angle.

In the embodiments shown in FIG. 13B, the reduced FOV of the wearable training apparatus 100 may have a vertical span of about 35° to about 75° with a superior span of about 15° to about 35° and an inferior span of about 20° to about 40°.

In the embodiments shown in FIG. 13C, the wearable training apparatus 100 may not block the superior FOV. consequently, the reduced FOV of the wearable training apparatus 100 may have a vertical span of about 80° to about 100° with a superior span of about 60° and an inferior span of about 20° to about 40°.

In some embodiments, the reduced FOV of the wearable training apparatus 100 may have a vertical span of about 90° with a superior span of about 60° and an inferior span of about 30°.

It is known in the art that the average pupillary distance (i.e., the horizontal distance between the centers of the pupils) is about 62 mm for women and about 64 mm for men. In the embodiments shown in FIG. 3B, the wearable training apparatus 100 may be worn in a manner similar to regular eyeglasses with the vertex distance of about 12 mm to about 14 mm and with the eyes vertically at about the center of the transparent regions 132. Therefore, the reduced FOV of the wearable training apparatus 100 shown in FIG. 3B has a horizontal span of about 97° to about 110° (about 48° to about 55° on each temporal side) with an adjusted binocular vision-area of about 58° to about 74° (about 29° to about 37° on each temporal side), and a vertical span of about 46° to about 54° (about 23° to about 27° upwardly and about 23° to about 27° downwardly).

In embodiments similar to that shown in FIG. 3B and with a deep sidewall 120 that makes the vertex distance greater than 14 mm (such as 20 mm), the horizontal and vertical spans of the reduced FOV of the wearable training apparatus 100 may be smaller than above-described ranges, thereby resulting in a further reduced FOV about the fixation direction.

Those skilled in the art will appreciate that other embodiments are readily available. For example, in an alternative embodiment, the training apparatus 100 comprises an eyeglasses portion and a vision-restriction attachment attached thereto. The eyeglasses portion is the same as a pair of conventional eyeglasses, and comprises a lens frame 102, a pair of transparent lens elements 104 embedded in or otherwise coupled to the lens frame 102, and a pair of side arms or temple pieces 106 each coupled to a respective side of the frame 102.

The vision-restriction attachment comprises a rigid base and a sidewall 120 extending rearwardly therefrom. The rigid base comprises the transparent regions 132 and the substantive opaque areas 134 (similar to those shown in FIG. 1). The vision-restriction attachment also comprises a coupling structure for coupling to the eyeglasses portion by suitable means such as clipping, gluing, screwing, and/or the like.

In another embodiment, the rigid base of the vision-restriction attachment does not comprise the substantive opaque areas 134. Rather, the training apparatus 100 comprises a layer of opaque material attachable to the lens elements 104 by suitable means such as gluing, taping, and/or the like, to form the opaque areas 134 and the transparent regions 132.

FIGS. 14 to 22 show a wearable training apparatus 100 in an alternative embodiment. The wearable training apparatus 100 in this embodiment is in the form of a goggle and is similar to the wearable training apparatus shown in FIG. 1. However, in this embodiment, the head-mounting assembly 103 does not comprise any temple pieces 106. Rather, the head-mounting assembly 103 in this embodiment comprises a flexible band 242 for coupling the training apparatus 100 to a user's head.

In this embodiment, the vision-control assembly 102 only comprises one transparent region 132 extending longitudinally from one eye to the other, thereby eliminating the possibility that an opaque area between the two eyes may block a portion of the FOV. Moreover, the vision-control assembly 102 does not comprise any lens element 108 and the transparent region 132 is generally an opening.

Figure 16A:
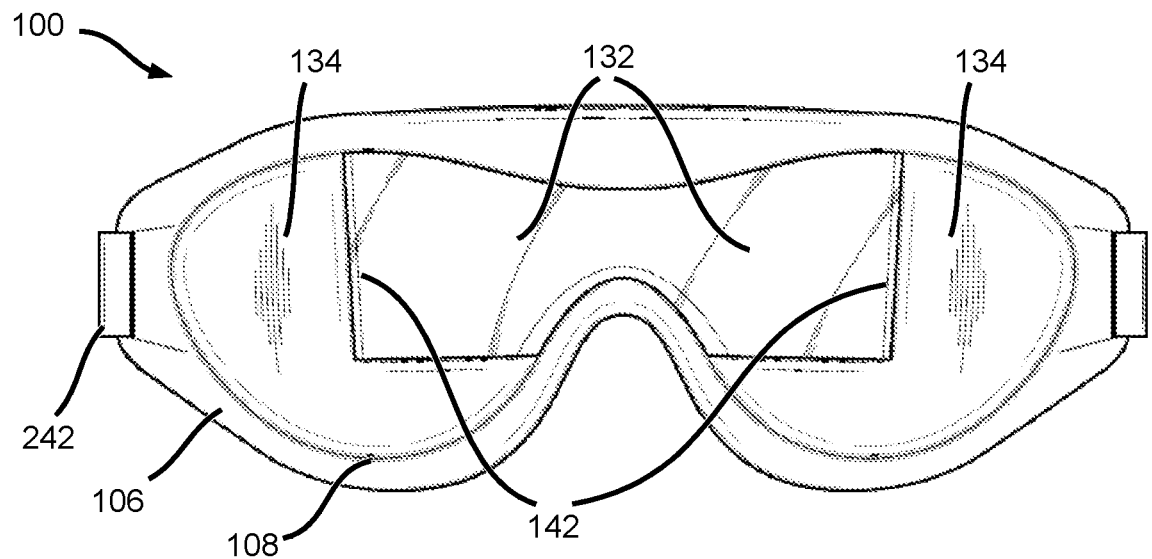
FIG. 16A is a front view of the training apparatus shown in FIG. 14.
Figure 16B:
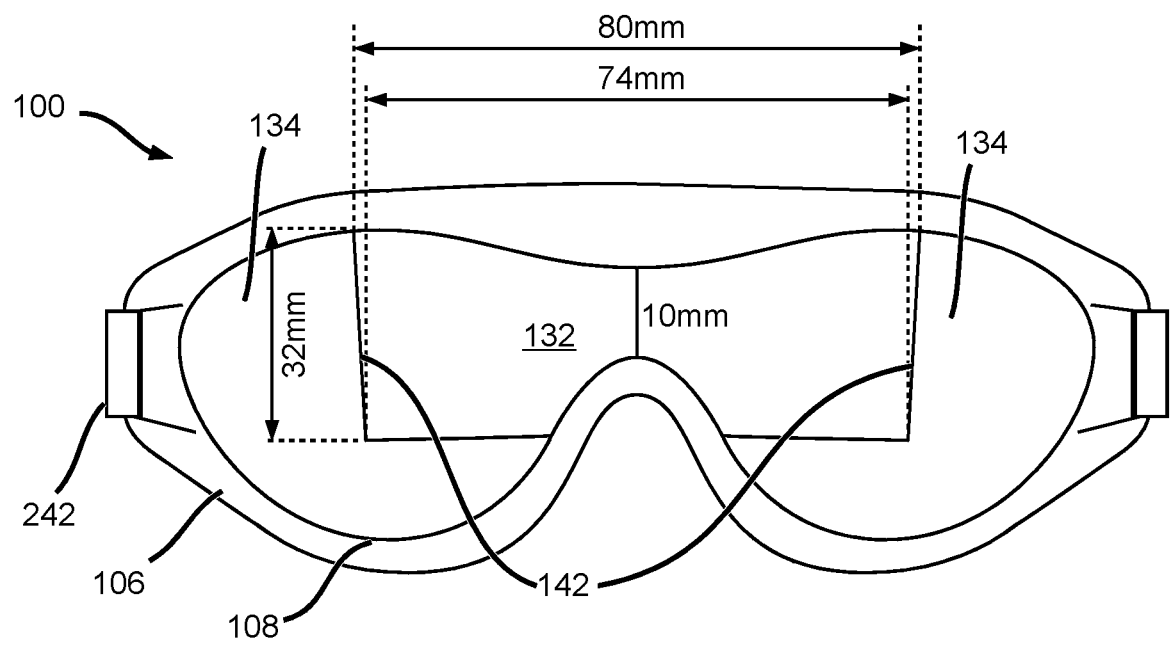
FIG. 16B is a front view of the training apparatus shown in FIG. 14, showing the dimension of the transparent regions thereof.
Figure 17:
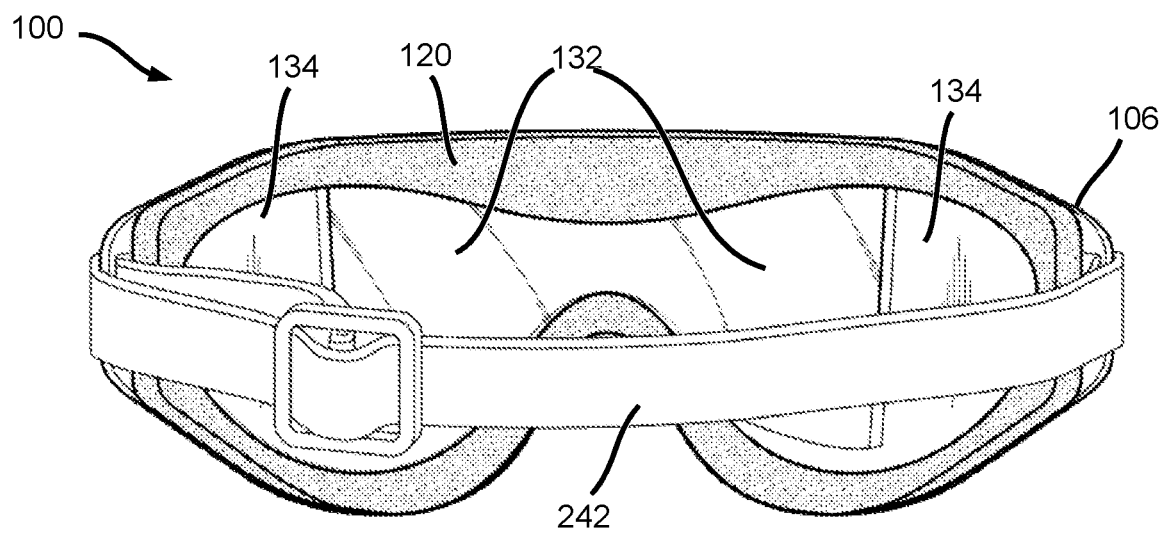
FIG. 17 is a rear view of the training apparatus shown in FIG. 14.
Figure 18:
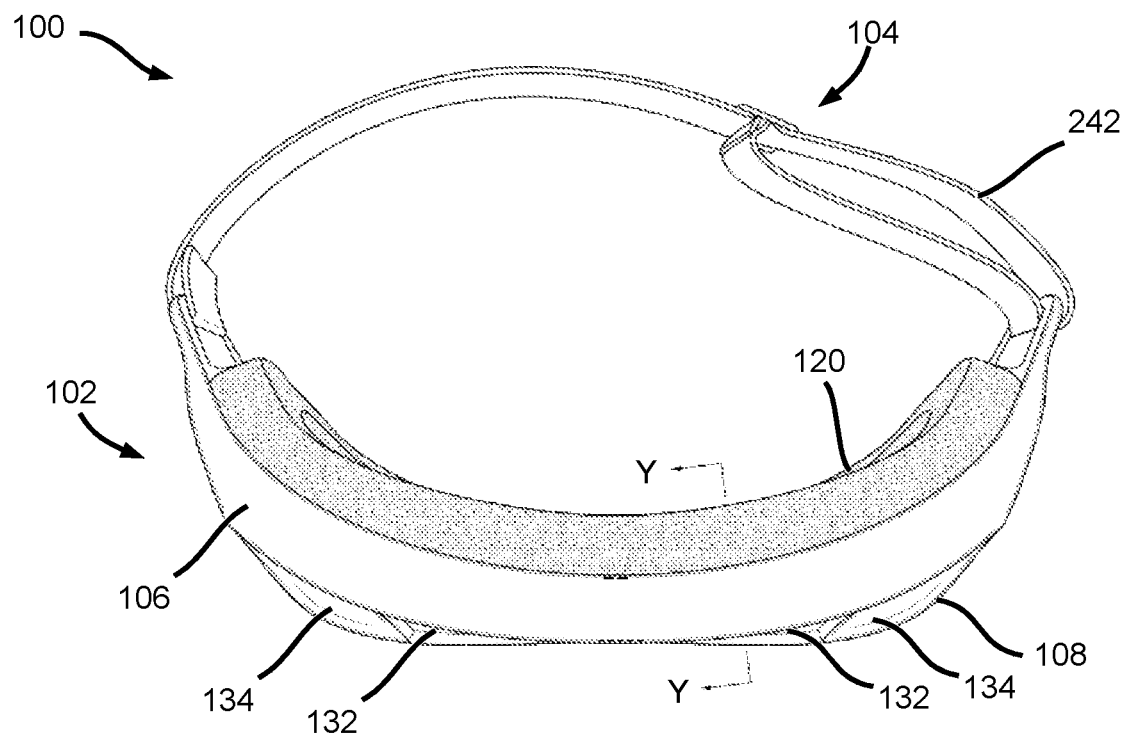
FIG. 18 is a perspective view of the training apparatus shown in FIG. 14, viewed from a top-front-viewing angle.
Figure 19:
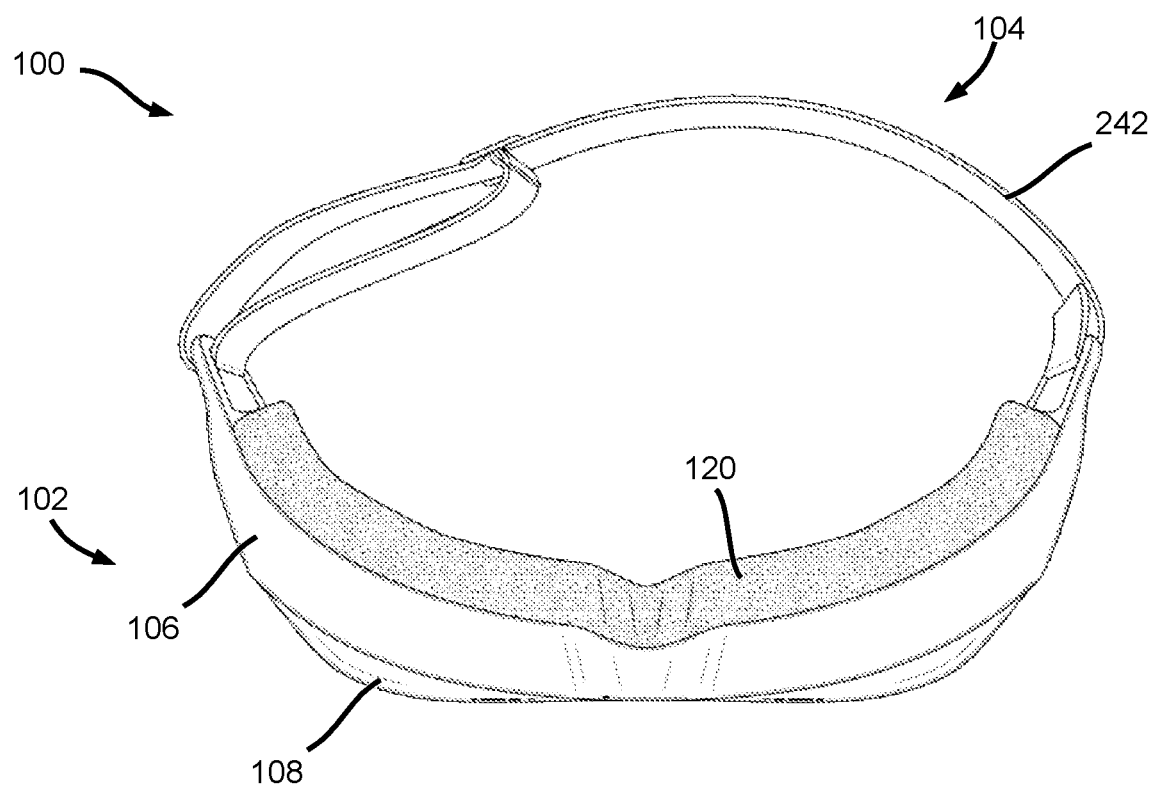
FIG. 19 is a perspective view of the training apparatus shown in FIG. 14, viewed from a bottom-front-viewing angle.
Figure 20:
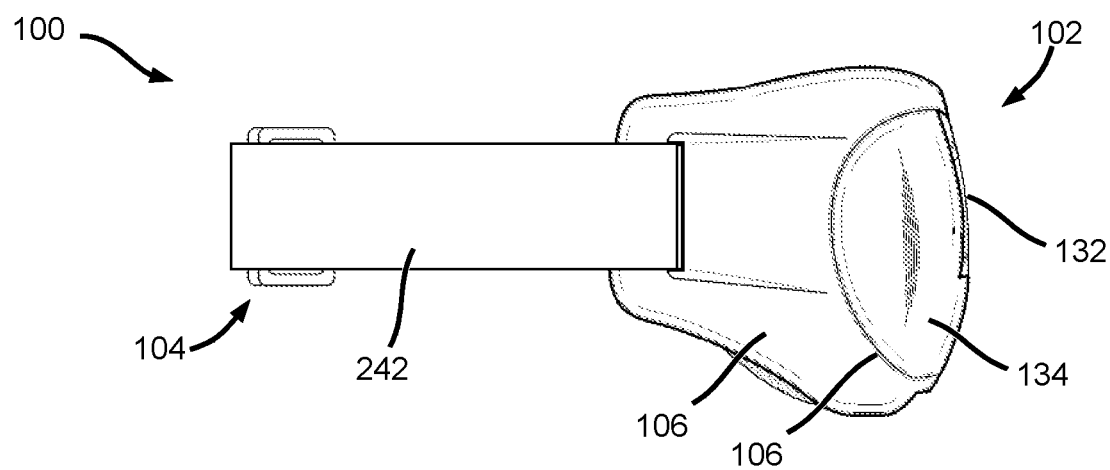
FIG. 20 is a side view of the training apparatus shown in FIG. 14, viewed from a first side thereof.
Figure 21:
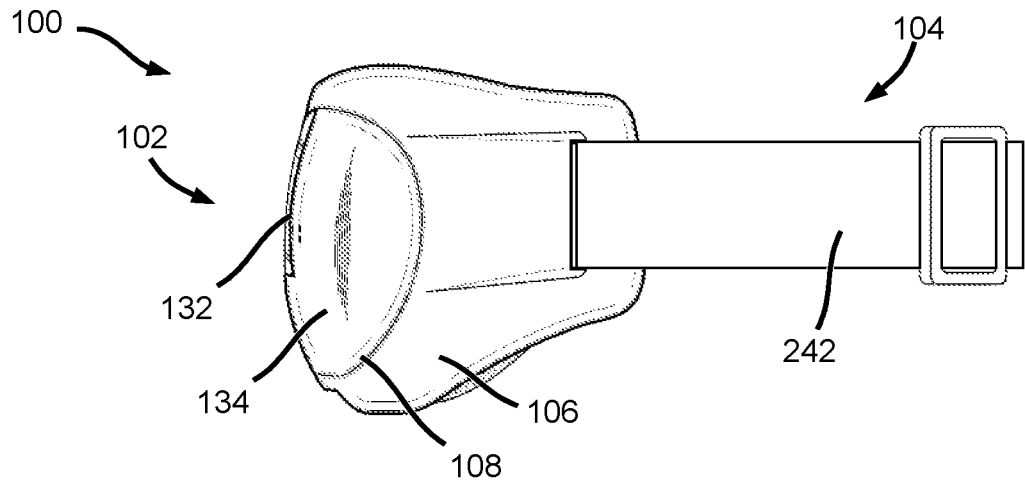
FIG. 21 is a side view of the training apparatus shown in FIG. 14, viewed from a second side thereof.
Figure 22:
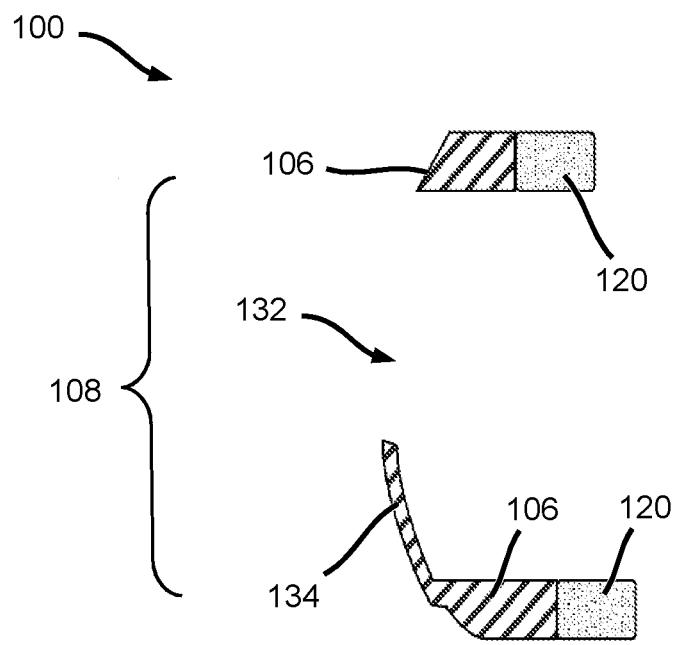
FIG. 22 is a cross-sectional view of the training apparatus along the section line Y-Y shown in FIG. 18.

As shown in FIG. 16B, the transparent region 132 has a longitudinal length of about 80 mm at a top side, and about 74 mm at a bottom side. The transparent region 132 has a lateral width of about 32 mm at the two temporal edges 142. The wearable training apparatus 100 may be worn in a manner similar to regular eyeglasses with the vertex distance of about 12 mm to about 14 mm and with the eyes vertically at about the center of the transparent regions 132. Therefore, the reduced FOV of the wearable training apparatus 100 shown in FIG. 16B has a horizontal span of about 120° (about 60° on each temporal side) with an adjusted binocular vision-area of about 48° to about 66° (about 24° to about 33° on each temporal side), and a vertical span of about 96° to about 108° (about 48° to about 54° upwardly and about 48° to about 54° downwardly).

Figure 23A:
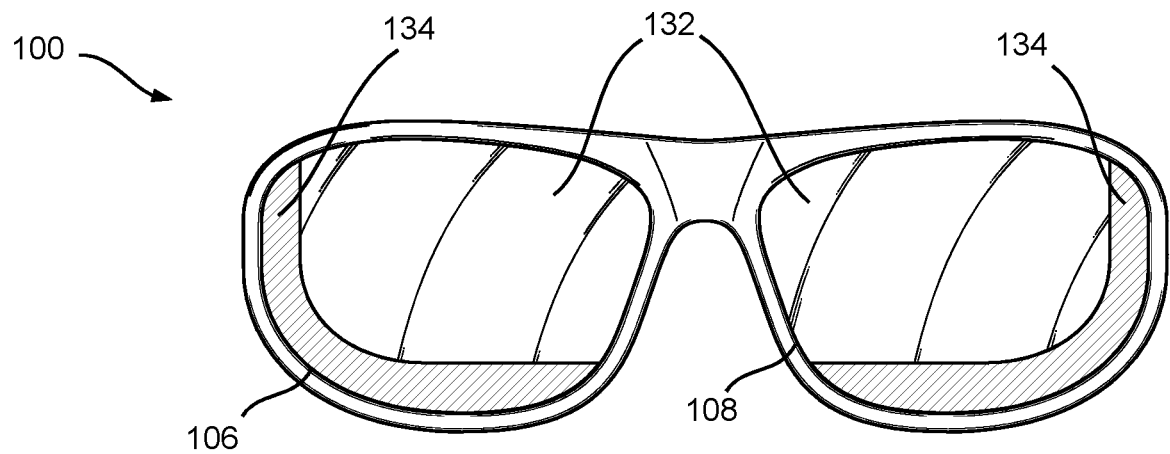
FIG. 23A is a front view of a training apparatus, according to another embodiment.
Figure 23B:
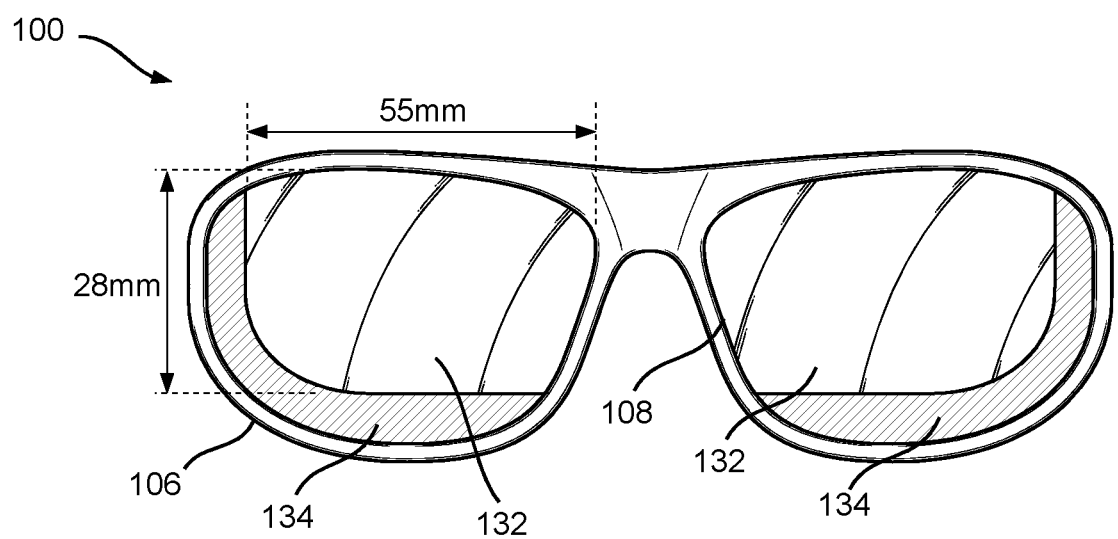
FIG. 23B is a front view of the training apparatus shown in FIG. 23A, showing the dimension of the transparent regions thereof.

In some embodiments, the superior FOV span may be different to the inferior FOV span. For example, in the embodiment shown in FIGS. 23A and 23B, the wearable training apparatus 100 is similar to that shown in FIG. 3B. However, the wearable training apparatus 100 in this embodiment has transparent regions 132 and opaque areas 134 arranged in a manner such that the superior FOV reduction of the wearable training apparatus 100 is smaller than the inferior FOV reduction thereof.

Figure 24A:
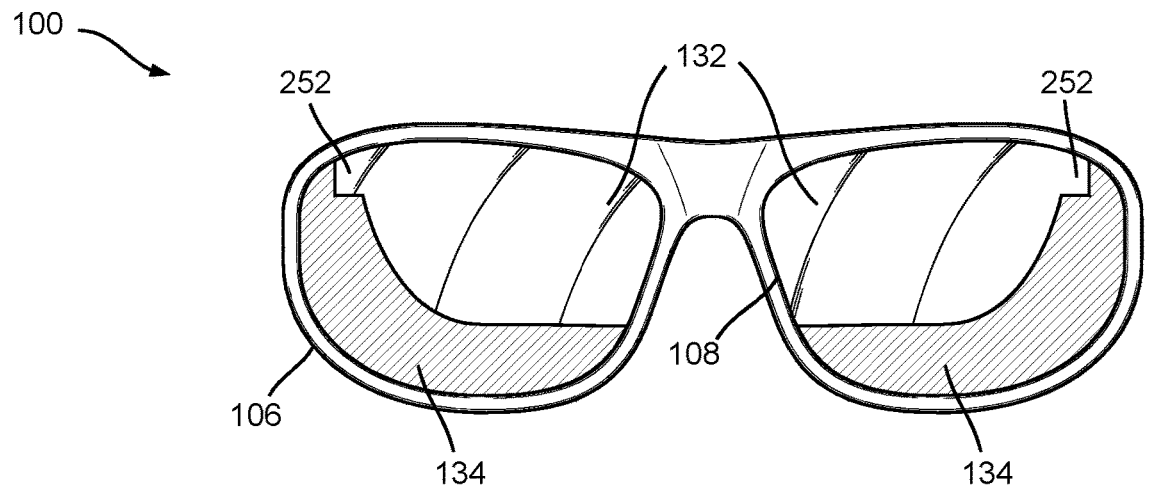
FIG. 24A is a front view of a training apparatus, according to yet another embodiment.
Figure 24B:
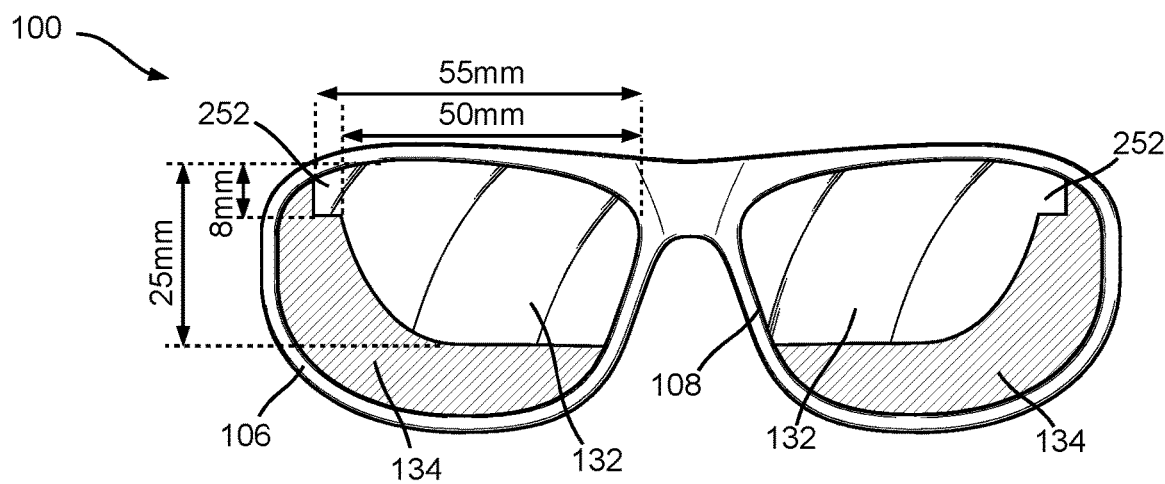
FIG. 24B is a front view of the training apparatus shown in FIG. 24A, showing the dimension of the transparent regions thereof.
Figure 25:
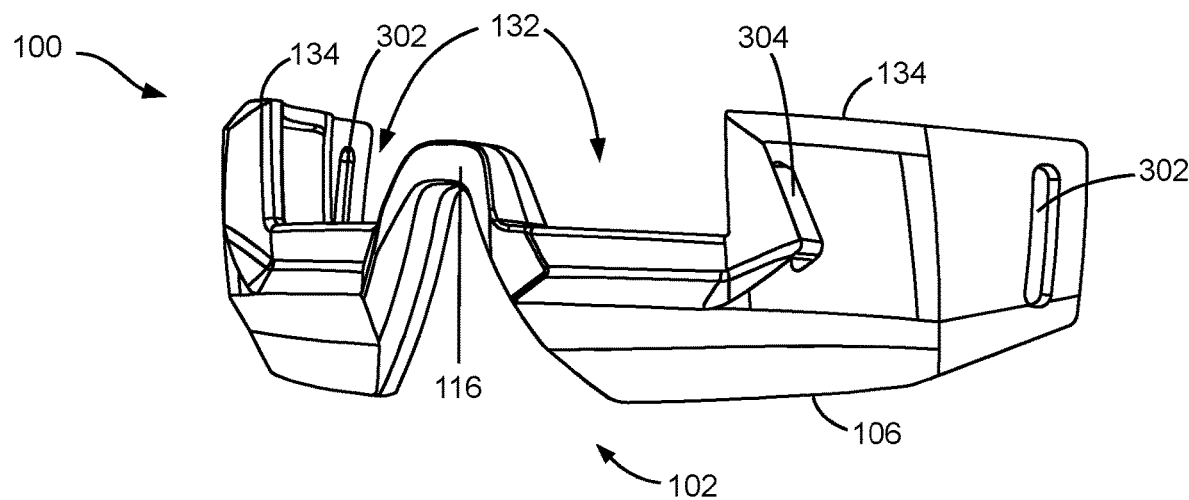
FIG. 25 is a front perspective view of a wearable training apparatus viewed from a front-viewing angle, another embodiment of this disclosure.
Figure 26:
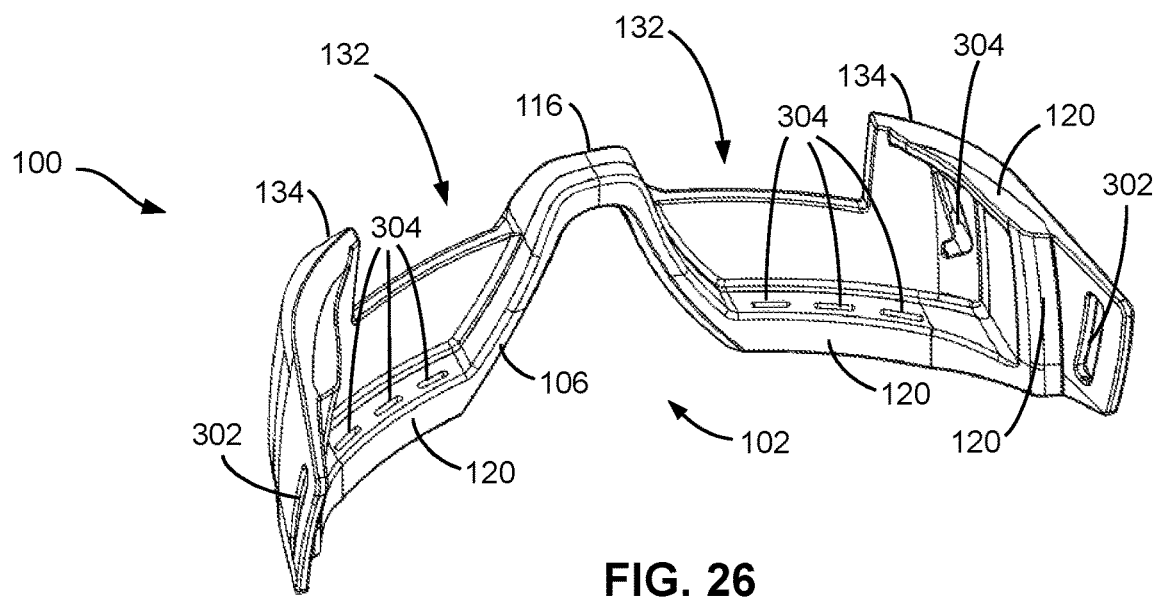
FIG. 26 is a rear perspective view of the wearable training apparatus shown in FIG. 25 viewed from a rear-viewing angle.

In an alternative embodiment, while the vision-blocking area substantially blocks a user's vision therein, the vision-blocking area may have one or more small transparent regions allowing light to pass through as long as the overall size of the one or more small transparent regions is small and would not form a peripheral vision to interfere the vision in the see-through area. FIGS. 24A and 24B show an example. In this example, the opaque area 134 comprises a small transparent region 252 at a corner thereof. However, the transparent region 252 is small in size and would not form a peripheral vision to interfere with the vision in the see-through area 132.

In an alternative embodiment shown in FIGS. 25 to 32, the wearable training apparatus 100 is in the form of wearable goggles and comprises a vision-control assembly 102 and a head-mounting assembly in the form of a flexible band (not shown).

The vision-control assembly 102 comprises a lens frame 106 made of a suitable material such as rigid plastic, resilient plastic, metal, and the like. The lens frame 106 comprises two mounting holes 302 on the distal sides thereof for mounting the flexible band to the lens frame 106, a notch at an upper side thereof about the area of the user's two eyes for forming a see-through area 132, and a nose piece 116.

The lens frame 106 also comprises a sidewall 120 extending rearwardly therefrom about the edges thereof except around the see-through area 132. The lens frame 106 including the sidewall 120 thus forms an opaque area 134 for limiting the user's FOV through the see-through area 132.

In this embodiment, the lens frame 106 and the sidewall 120 also comprise a plurality of ventilation holes 304. Moreover, the see-through area 132 extends to the top of the lens frame 106 with no sidewall thereabove. Such a "top-opened" see-through area 132 also facilitates the ventilation.

Figure 27A:
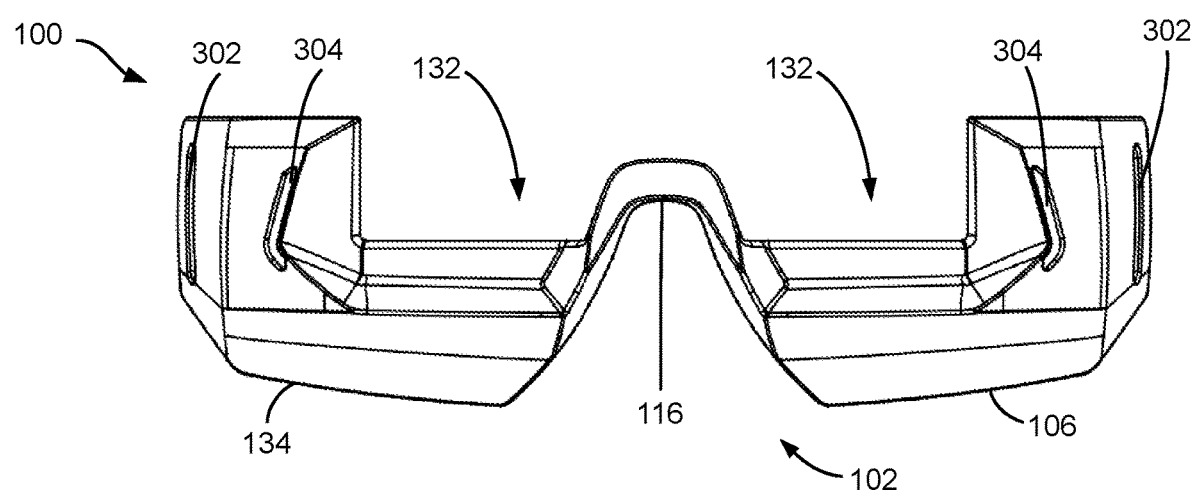
FIG. 27A is a front view of the wearable training apparatus shown in FIG. 25.
Figure 27B:
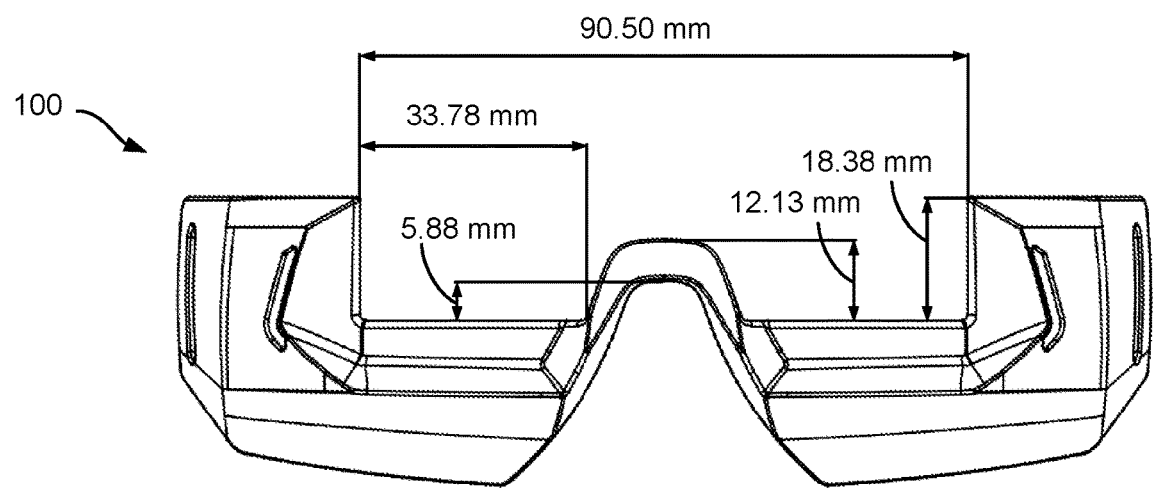
FIG. 27B is a front view of the wearable training apparatus shown in FIG. 27, showing the dimension of the transparent regions thereof.
Figure 28:
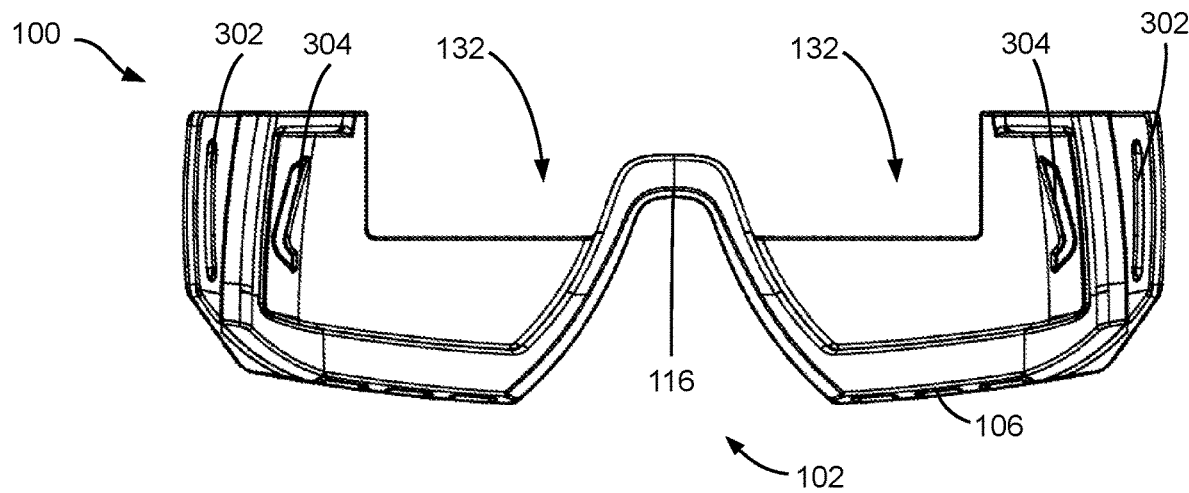
FIG. 28 is a rear view of the wearable training apparatus shown in FIG. 25.
Figure 29:
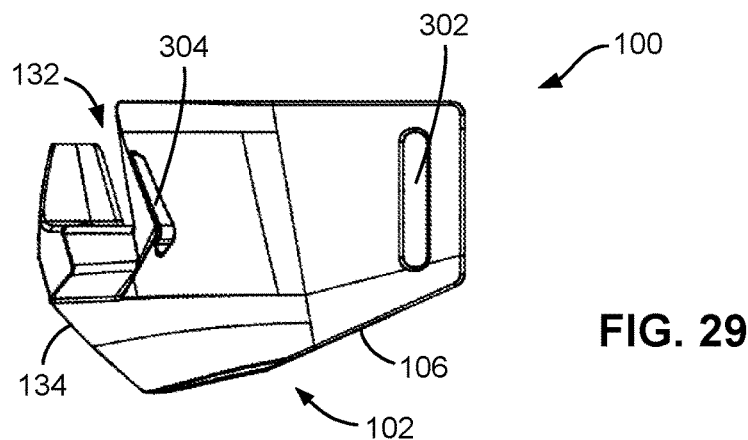
FIG. 29 is a side view of the wearable training apparatus shown in FIG. 25, viewed from a first side thereof.
Figure 30:
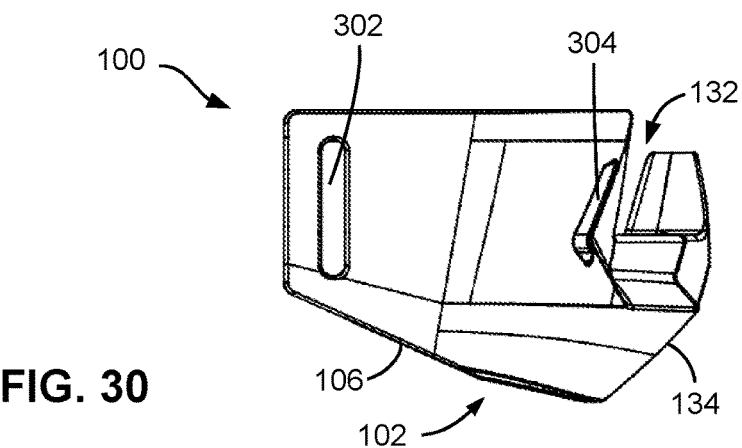
FIG. 30 is a side view of the wearable training apparatus shown in FIG. 25, viewed from a second side thereof.
Figure 31:
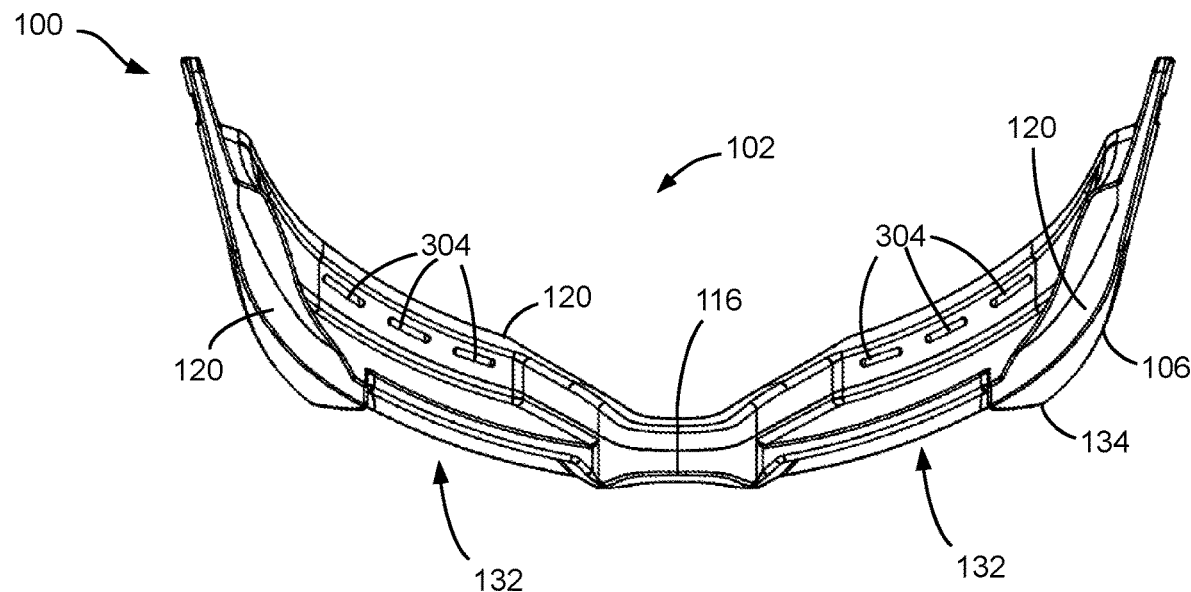
FIG. 31 is a plan view of the wearable training apparatus shown in FIG. 25.
Figure 32:
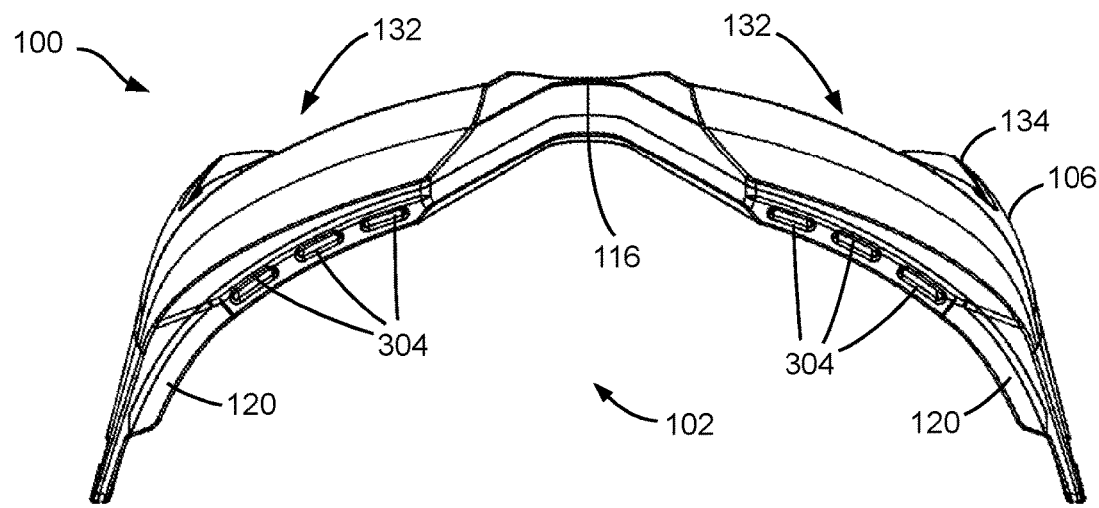
FIG. 32 is a bottom view of the wearable training apparatus shown in FIG. 25.

As shown in FIG. 27B, the see-through area 132 has a total longitudinal length of 90.5 mm and a lateral width of 18.38 mm. The nose piece 116 is at the longitudinal center of the see through area 132 and the top thereof is 12.13 mm to the bottom edge of the see-through area 132.

The wearable training apparatus 100 may be worn in a manner similar to regular eyeglasses with the vertex distance of about 12 mm to about 14 mm and with the pupils substantially vertically flush with the top of the nose piece 116. Therefore, the reduced FOV of the wearable training apparatus 100 shown in FIG. 27B has a horizontal span of about 120° (about 60° on each temporal side) with an adjusted binocular vision-area of about 48° to about 100° (about 24° to about 50° on each temporal side).

As the see-through area 132 extends to the top of the lens frame 106 with no sidewall thereabove, the superior span of the reduced FOV is the same as the natural superior span of the human eye's FOV, i.e., about 60°. The inferior span of the reduced FOV is about 45° to about 54°, resulting in a vertical span of about 105° to about 114°.

Those skilled in the art will appreciate that the above embodiments and the sizes and/or locations of the see-through area 132 described therein are examples only. In various embodiments, the wearable training apparatus 100 and the see-through area 132 thereof may choose other parameters to adapt to the user's eye parameters such as the vertex distance, the pupillary distance, and/or the like. For example, the wearable training apparatus 100 in some embodiments may have a plurality of predetermined sizes for adapting to different people. The wearable training apparatus 100 in some other embodiments may be customizable based on the user's eye parameters.

As described above, the wearable training apparatus 100 provides a reduced FOV about the gaze direction through the see-through area 132. The reduced FOV area substantially encompasses the natural binocular vision-area of human eyes with an adjusted binocular vision-area substantially encompassing the area-of-focus of human eyes. The natural monocular vision-area of human eyes are blocked by the opaque area 134 of the wearable training apparatus 100.

Compared to the natural monocular vision-area, the natural binocular vision-area of human eyes provides better visual contact with objects therewithin with important depth information. The area-of-focus of human eyes provides the most visual details of objects therewithin and attracts the most focused attention of the person.

The horizontal and vertical angular span of the reduced FOV are important. A large horizontal span that encompasses a substantial portion of the natural monocular vision-area may introduce overwhelmed distraction to the user and may allow the user to maintain a target object in the natural monocular vision-area, thereby causing the training to fail. On the other hand, a small horizontal and/or vertical span leads to a so-called tunnel vision and the user may not sense sufficient environment context and/or may constant lose visual contact with the one or more target objects.

When a user wears the wearable training apparatus 100 in training, the user is forced to move his/her body and head to maintain visual contact with one or more target objects. As a result, the user is trained to maintain the one or more target objects within the natural binocular vision-area and more importantly within the area-of-focus.

The wearable training apparatus 100 restricts peripheral vision and disallows eyes to look down in the bottom of their sockets. Consequently, the user's eyes are maintained in the middle of their sockets which allows the eyes to operate (such as converge and diverge) at their maximum capacity. The wearable training apparatus 100 creates a central vision which ensures a high quality of visual stimulus received from the eyes and allows the brain to obtain the best information of the objects being tracked, thereby forming an improved reaction towards the tracked objects.

Therefore, using the wearable training apparatus 100 facilitates the establishment of physical reaction including movement of the head, body, and the entire human stimulus system, the mental reaction, and the related neurological processes, thereby training the user to manage the central vision through moving the head and body, maintaining balance, managing head and body movements in reacting towards the tracked objects, and thereby creating an improved constant visualization of the objects.

By using the wearable training apparatus 100, the user is trained to cognitively react to tracked objects with cooperative mental and physical actions. Once the user's mental and muscle reactions are memorized and become subconscious reactions, the user may practice without wearing the wearable training apparatus 100 and react to tracked objects in real-time with simplified, more reliable actions. Such a motion-reaction memory in combination with technical training (i.e., training of motion techniques) may greatly improve the user's practice in various areas such as sports (e.g., ice hockey, golf, horse riding, flying, and the like), military actions, machine operation, and the like.

FIG. 33 is a schematic view of a training system 330 according to one embodiment of this disclosure. The training system 330 comprises at least one wearable training apparatus 100 worn by a user 332, at least one imaging device 334 such as a camcorder functionally coupled to and in communication with at least one computing device 336 via at least one suitable wired or wireless connection 338 such as Ethernet, serial cable, parallel cable, USB cable, HDMI® cable (HDMI is a registered trademark of HDMI Licensing LLC, San Jose, CA, USA), WI-FI® (WI-FI is a registered trademark of Wi-Fi Alliance, Austin, TX, USA), BLUETOOTH® (BLUETOOTH is a registered trademark of Bluetooth Sig. Inc., Kirkland, WA, USA), ZIGBEE® (ZIGBEE is a registered trademark of ZigBee Alliance Corp., San Ramon, CA, USA), 3G or 4G wireless telecommunications, and/or the like.

The user 332 wearing the training apparatus 100 is in training to focus on an object 340. For example, the user may be a golfer and the object is a golf ball. A trainer (not shown) may use the methods and systems disclosed herein to train the user 332 to maintain eye contact with the golf ball 340 while executing coordinated movements of their torso, arms, and legs to hit the golf ball 340.

As the user 332 can only see the golf ball 340 via the see-through area of the training apparatus 100, the user 332 is able to learn how to properly position his head and body to maintain the golf ball 340 within a central portion of the user's FOV during the processes of addressing and striking the golf ball 340. For example, the user will learn to keep their head in a still fixed position to maintain focused eye contact with the ball while they are rotating their torso and arms during the back swing and forward swing movements. The imaging device 334 records the user's actions during their execution of golf swings and sends the recorded images or video streams to the computing device 336 for replay or for analysis.

In some embodiments, the computing device 336 executes a software program for tracking the user's motion using the at least one imaging device 334. In some embodiments, the computing device 336 may further execute a software program for processing the recorded images and/or video streams in reference to one or more selected sets of training images and/or video clips to produce feed-back images and/or video clips, to analyze the user's motion, and to establish, maintain, and expand individualized database records of training sessions.

Once the user has learned how to properly position his head and body to maintain the golf ball 504 within a central portion of the user's FOV, the user can play golf without wearing the training apparatus, and still be able to keep the golf ball in focused view in the trained manner.

In an alternative embodiment, the system 100 may not comprise a computing device 336.

In an alternative embodiment, the system 100 may not comprise a display for playback the recorded images and/or video streams.

Of course, those skilled in the art will appreciate that the above described training apparatus 100 and system 330 are not restricted to training golfers. In various embodiments, the above described training apparatus 100 and system 330 may be used to train athletes in other sports areas such as hockey player, tennis players, basketball player, soccer players, and/or the like, workers, police officers, military personnel, rescue crews, and the like in various tasks. Generally, the above described training apparatus 100 and system 330 may be used to train people in various areas who need eye/hand or vision/hand coordination, eye/body or vision/body coordination, and/or the like to focus on, act on, and/or react on one or more moving targets such as a golf ball, a puck, a tennis ball, a basketball, a soccer ball, and/or the like.

Correspondingly, in various embodiments, the computing device 336 may comprise a database storing training images and/or video clips for selected sports and sports activities such as golf, hockey, tennis, basketball, soccer, and/or the like. The database may also or alternatively store training images and/or video clips for selected workplace equipment such as stick shifts, machinery, military weapons, and/or the like.

FIG. 34A shows a wearable training apparatus 400 in some embodiments. As shown, the wearable training apparatus 400 in these embodiments comprises a headgear 402 in the form of a helmet such as an ice hockey goalie mask. The headgear 402 comprises a helmet body 404 for wearing on a user's head with a front opening 406 about a user's face area including the area about the user's eyes. The headgear 402 also comprises a protective fence 408 covering or overlaying with the front opening 406 without significantly blocking or interfering the user's vision.

As also shown in FIG. 34B, the wearable training apparatus 400 also comprises a vision-control assembly 102 similar to that described in above embodiments and demountably attached inside the helmet 402 about the user's eyes. The vision-control assembly 102 is located at a distance to the user's eyes as described above (e.g., with the vertex distance of about 12 mm to about 14 mm) and has at least a sidewall (not shown) extending rearwardly from a bottom side of the lens frame 106 thereof. Thus, when worn by a user, the wearable training apparatus 400 provides a reduced FOV. The portion of the natural FOV of human eyes outside the reduced FOV is blocked.

Similar to the description above, the reduced FOV may correspond to a central portion of the human FOV. For example, in some embodiments, the reduced FOV may have a horizontal span encompassing at least a major portion of a natural binocular vision-area of the natural FOV of human eyes and/or have a vertical span encompassing at least a major portion of a vertical area-of-focus of the natural FOV of human eyes. In some embodiments, the reduced FOV may further encompass a minor portion of natural monocular vision-areas of the natural FOV of human eyes.

For example, in some embodiments, the reduced FOV may have a horizontal span of about 120° (about 60° on each temporal side) with an adjusted binocular vision-area of about 48° to about 100° (about 24° to about 50° on each temporal side). In some embodiments, the vertical span of the reduced FOV may have an inferior span of about 20° to about 40°. In some embodiments, the vertical span of the reduced FOV may have an inferior span of about 30°.

In some embodiments, the vision-control assembly 102 may be permanently attached inside the helmet 402 about the user's eyes and be an integrated part of the helmet 402.

Figure 35A:
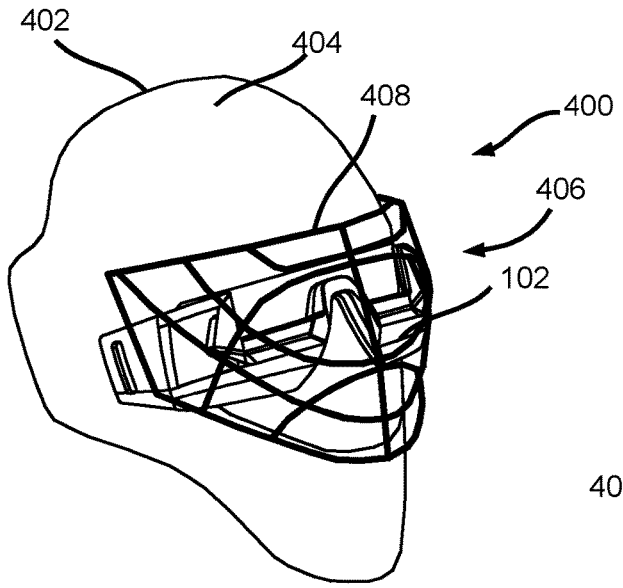
FIG. 35A is a perspective view of a wearable training apparatus having a helmet with a protective fence and a vision-control assembly, according to some embodiments of this disclosure, wherein the vision-control assembly is coupled to the helmet between the helmet and the protective fence.
Figure 35B:
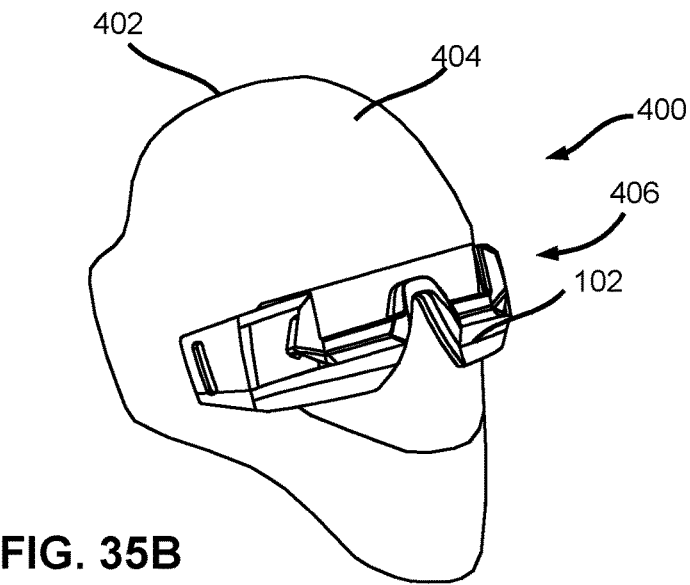
FIG. 35B is a perspective view of the wearable training apparatus shown in FIG. 35A without the protective fence.

FIGS. 35A and 35B show a wearable training apparatus 400 in some alternative embodiments. The wearable training apparatus 400 in these embodiments is similar to that shown in FIGS. 34A and 34B except that in these embodiments, the vision-control assembly 102 is demountably attached outside the helmet 402 about the user's eyes between the helmet 402 and the fence 408.

In some embodiments, the vision-control assembly 102 may be permanently attached outside the helmet 402 about the user's eyes and be an integrated part of the helmet 402.

While it may be possible to convert the fence 408 into a vision-control assembly (i.e., a vision-limited fence) by attaching a suitable opaque material thereto about the user's eyes, the resulting vision-limited fence 408 may not provide sufficient peripheral-vision blocking. Specifically, as the vision-limited fence 408 is generally at a greater distance to the user's face, there may be an excessively large vertex distance between the vision-limited fence 408 and the user's eyes such that ambient light from top directions may be deflected into user's eyes from locations therebelow thereby causing some residue peripheral vision which may interfere with the user's exercise of focused visual tracking of moving or stationary objects.

Figure 36:
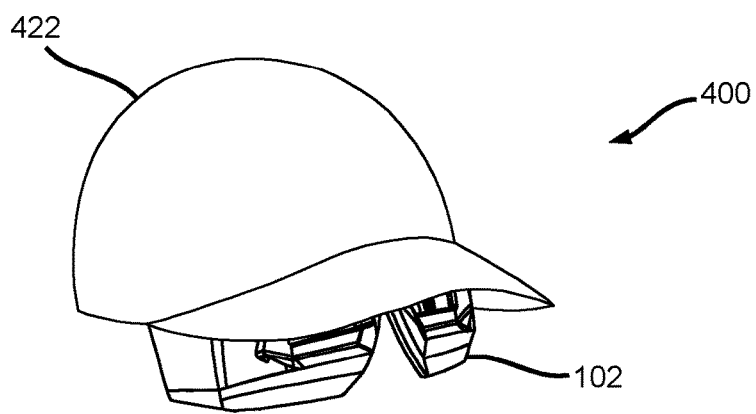
FIG. 36 is a perspective view of a wearable training apparatus having a hat and a vision-control assembly, according to some embodiments of this disclosure.

FIG. 36 shows a wearable training apparatus 400 in some alternative embodiments. The wearable training apparatus 400 in these embodiments comprises a helmet 422 in the form of a hat such as a baseball hat or a golfer's hat, with a vision-control assembly 102 coupled thereto. In some embodiments, the vision-control assembly 102 may be demountably coupled to the hat 422. In some other embodiments, the vision-control assembly 102 may be permanently coupled to the hat 422 and become an integrated portion thereof.

Figure 37:
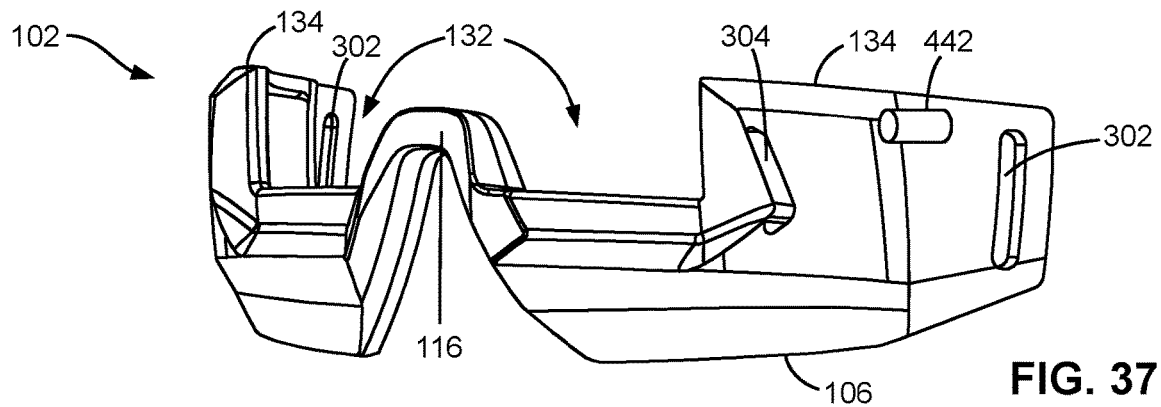
Figure 38:
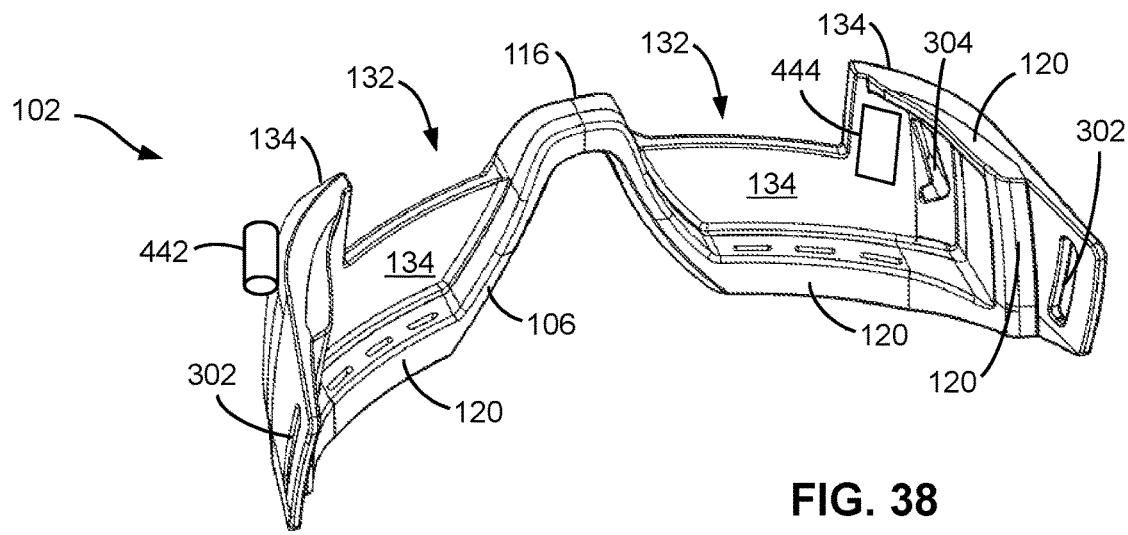
Figure 39:
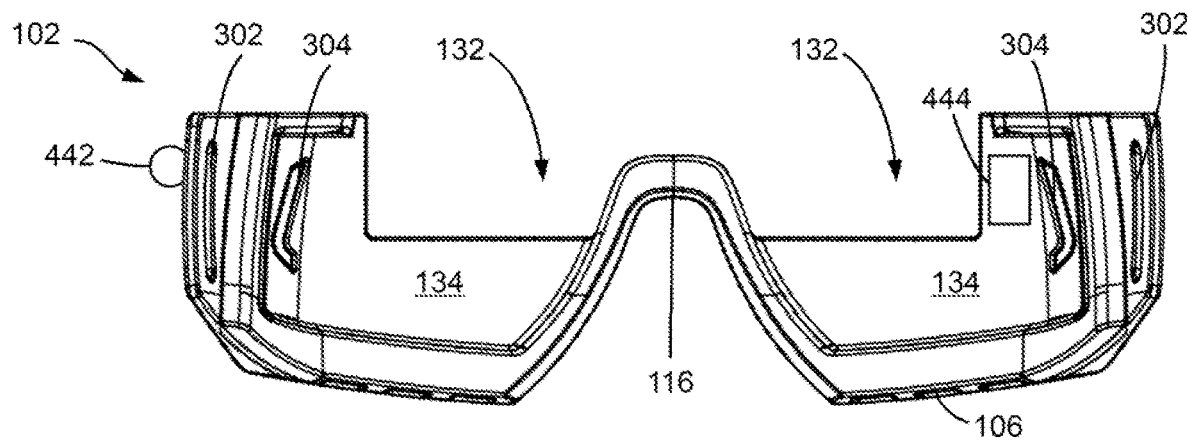

FIGS. 37 to 39 show a vision-control assembly 102 which may be directly wearable, or attached to a helmet or hat, or being an integrated portion thereof, according to some embodiments of this disclosure. The vision-control assembly 102 is similar to that shown in FIGS. 25 to 32 except that the vision-control assembly 102 in these embodiments further comprises an imaging device 442 such as a video camera attached thereto, a display or screen 444 on the inner side of the opaque area 134 thereof, and necessary circuitry (not shown) connecting the imaging device 442 and the display 444.

The circuitry also comprises a wired or wireless communication module for communicating with a computing device such as the computing device 336 of the training system 330 shown in FIG. 33, for sending the images captured by the imaging device 442 and for receiving information (e.g., text and/or images) for displaying on the display 444. Therefore, the vision-control assembly 102 may be used in the training system 330 with the imaging device 442 on the vision-control assembly 102 substituting the imaging device 334 or as a supplementary thereto for evaluating the performance of the user 332.

In some embodiments, the vision-control assembly 102 may only comprise a display 444 on the inner side of the opaque area 134 thereof and may not comprise any imaging device 442 attached thereto.

In some embodiments wherein the transparent region 132 has a lens (rather than merely an opening), the display 444 may be a "see-through" display in the transparent region 132. Such a display 444 may be a see-through liquid crystal display (LCD), a see-through light-emitting diode (LED) display, a micro-projector, or other suitable displays.

Figure 40:
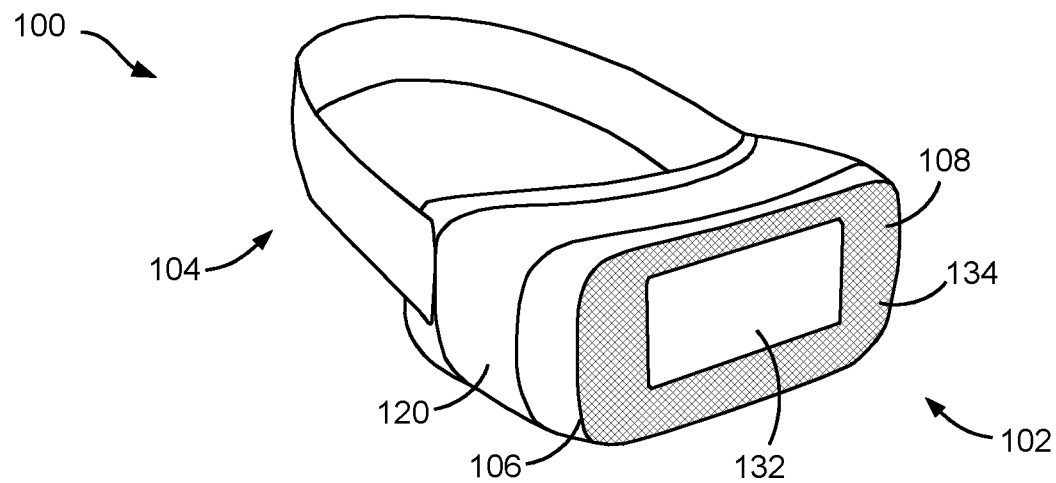
FIG. 40 is a perspective view of a wearable training apparatus, according to yet some embodiments of this disclosure.
Figure 41:
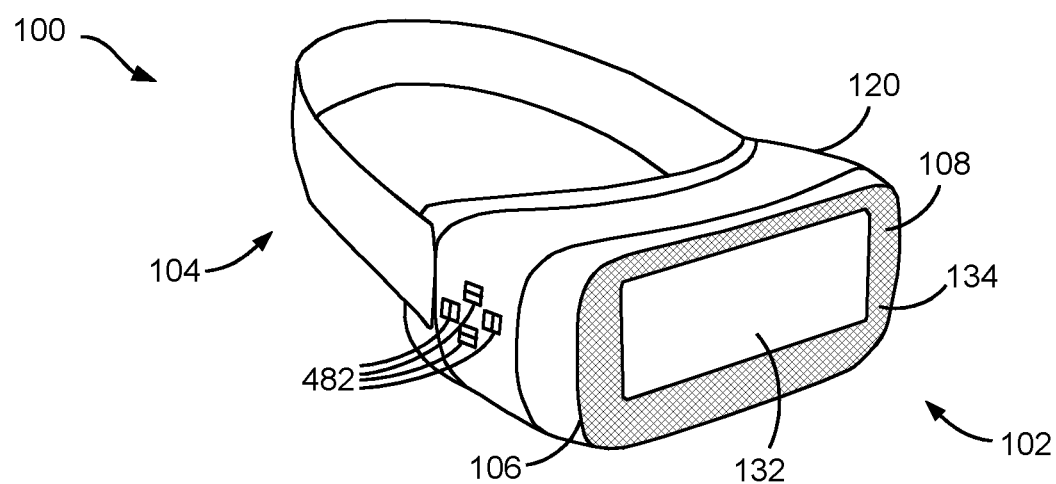
FIG. 41 is a perspective view of a wearable training apparatus, according to still some embodiments of this disclosure.

FIGS. 40 and 41 show a wearable training apparatus 100 in some other embodiments. The wearable training apparatus 100 is in the form of an Augmented Reality (AR) goggle and comprises a vision control assembly 102 and a head-mounting assembly 104 in the form of a strap. The vision control assembly 102 comprises a lens frame 106 and a sidewall 120 extending rearwardly from the peripheral of the lens frame 106 for engaging a user's face and blocking the user's peripheral view otherwise visible through the gap between the lens frame 106 and the user's face.

The lens frame 106 comprise a lens element 108 and a control circuitry (not shown). The lens element 108 in these embodiments is a see-though display such as a see-through LCD, a see-through LED display, or the like. In use, the control circuitry controls the lens element 108 to display a dark color in a peripheral area 134 thereof to render it an opaque area and render a central area 132 substantively transparent. The size and location of the see-through central area 132 is generally the same as the transparent region described above to restrict the user's FOV to an above-described reduced FOV.

As shown in FIG. 41, the wearable training apparatus 100 may also provide an adjustment mechanism such as a set of buttons 482 for the user to adjust the size and position of the transparent region 132 to adapt to the user's eyes such as adapting the user's specific pupillary distance and vertex distance when wearing the wearable training apparatus 100 for achieving desired training results.

In some embodiments, the lens element 108 is a touch-sensitive display with the front surface thereof being touch-sensitive thereby allowing the user to adjust the size and position of the transparent region 132 in a more intuitive manner through touch inputs.

In some embodiments, the control circuitry may also control the lens element 108 to display relevant information as text and/or images on the lens element 108 overlying with the transparent region 132 and/or the opaque area 134.

In some embodiments, the control circuitry may further communicate with a computing device such as the computing device 336 in the training system 330 shown in FIG. 33 to receive data therefrom for displaying on the lens element 108. In some other embodiments, the wearable training apparatus 100 may further comprise an imaging device similar to that shown in FIGS. 37 to 39.

Although in the embodiments shown in FIGS. 40 and 41, the wearable training apparatus 100 only comprises one lens element 108, in some alternative embodiments, the wearable training apparatus 100 may comprise two or more lens elements 108 configured in a manner similar to that shown in FIG. 1.

Although embodiments have been described above with reference to the accompanying drawings, those of skill in the art will appreciate that variations and modifications may be made without departing from the scope thereof as defined by the appended claims.

What is claimed is:

1. A wearable training apparatus comprising:
    a vision-control assembly for engaging a user's face about the user's eyes, said vision-control assembly comprising a see-through area about the user's eyes and an opaque area surrounding the see-through area at least on a temporal side and an inferior side thereof;
    wherein the opaque area is for substantially blocking at least major portions of the natural monocular vision-areas of a natural field of vision (FOV) of the user's eyes, said natural monocular vision-areas being peripheral to a natural binocular vision-area on respectively temporal sides;
    wherein the see-through area is for forming a reduced FOV about a gaze direction; and
    wherein the reduced FOV has a span encompassing at least a major portion of the natural binocular vision-area of the natural FOV of the user's eyes about the gaze direction thereof, said natural binocular vision-area being at an angular center of the natural FOV.

2. The wearable training apparatus of claim 1, wherein the opaque area is for substantially blocking at least the major portions of the natural monocular vision-areas of a natural FOV of the user's eyes on the temporal sides thereof and on a bottom side thereof; and
    wherein the see-through area extends to a top side of the vision-control assembly.

3. The wearable training apparatus of claim 2, wherein the vision-control assembly comprises a rear-extending opaque sidewall about at least the temporal side, the nasal side, and the inferior side of the see-through area; and wherein the sidewall is made of a soft material.

4. The wearable training apparatus of claim 3, wherein at least one of the sidewall and the opaque area comprises a plurality of second ventilation holes.

5. The wearable training apparatus of claim 1, wherein the reduced FOV has a vertical span encompassing at least a major portion of a vertical area-of-focus of the natural FOV of the user's eyes.

6. The wearable training apparatus of claim 5, wherein the vertical span of the reduced FOV is about 35° to about 75° with a superior span of about 15° to about 35° and an inferior span of about 20° to about 40°;
    wherein the vertical span of the reduced FOV is about 55° with a superior span of about 25° and an inferior span of about 30°;
    wherein the vertical span of the reduced FOV is about 35° to about 75° with a superior span of about 15° to about 35° and an inferior span of about 20° to about 40°;
    wherein the vertical span of the reduced FOV is about 80° to about 100° with a superior span of about 60° and an inferior span of about 20° to about 40°; or
    wherein the vertical span of the reduced FOV is about 90° with a superior span of about 60° and an inferior span of about 30°.

7. The wearable training apparatus of claim 1, wherein the reduced FOV encompasses the entire natural binocular vision-area of the natural FOV of the user's eyes.

8. The wearable training apparatus of claim 7, wherein the reduced FOV further encompasses a minor portion of natural monocular vision-areas of the natural FOV of the user's eyes.

9. The wearable training apparatus of claim 1, wherein the reduced FOV is about 120° with about 60° on each temporal side; about 60° with about 30° on each temporal side; about 80° to about 100° with about 40° to about 50° on each temporal side; about 100° to about 140° with about 50° to about 70° on each temporal side; or about 110° to about 130° with about 55° to about 65° on each temporal side.

10. The wearable training apparatus of claim 1, wherein the reduced FOV comprises an adjusted binocular vision-area substantially encompassing a horizontal area-of-focus of the natural FOV of the user's eyes; and
    wherein the adjusted binocular vision-area has a horizontal span of about 40° to about 60° with about 20° to 30° on each temporal side; of at least about 60° with at least about 30° on each temporal side; or of about 100° with about 50° on each temporal side.

11. The wearable training apparatus of claim 1 further comprising a headgear; wherein the vision-control assembly is coupled to the headgear.

12. The wearable training apparatus of claim 11, wherein the headgear comprises a helmet body with a front opening about the user's eyes and a protective fence covering the front opening; and wherein the vision-control assembly is attached between the helmet body and the protective fence.

13. The wearable training apparatus of claim 1 further comprising:
  a display on an inner side of a lens frame overlapping with at least one of the see-through area and the opaque area; and
  a control circuitry functionally coupled to the display for controlling the displaying of the display.

14. The wearable training apparatus of claim 1, wherein the lens frame comprises at least one see-through display, said see-though display is configured for rendering a central portion thereof see-through for forming said see-through area and for displaying a dark color in a peripheral portion thereof surrounding the see-through area for forming said opaque area.

15. The wearable training apparatus of claim 14 further comprising:
  an input component;
  a control circuitry functionally coupled to the input component and the at least one see-through display for receiving user input from the input component and adjusting the size and position of the see-through area of the see-through display based on received user input.

16. The wearable training apparatus of claim 1, wherein the vision-control assembly comprises a transparent material, a first portion of the transparent material covering the see-through area and a second portion of the transparent material being rendered opaque by gluing, staining, painting, or coupling thereto a layer of opaque material.

17. The wearable training apparatus of claim 1 further comprising a coupling structure for coupling the wearable training apparatus to a pair of eyeglasses, or a head-mounting assembly for coupling the wearable training apparatus to the user's face.

18. The wearable training apparatus of claim 17, wherein the coupling structure is for coupling the vision-control assembly to the user's face about the user's eyes with a vertex distance of about 12 millimeters (mm) to about 14 mm, said vertex distance being a distance between a rear-end of the see-through area and the front of the cornea of the eyes.

19. A system for training a user comprising:
  a wearable training apparatus of claim 1, for being worn by the user;
  at least one imaging device for capturing images of the user wearing the wearable training apparatus; and
  a computing device in communication with the at least one imaging device for tracking the user's motion using the at least one imaging device.

20. A system for training a user comprising:
  a wearable training apparatus of claim 13, for being worn by the user;
  at least one imaging device for capturing images of the user wearing the wearable training apparatus; and
  a computing device in communication with the at least one imaging device for tracking the user's motion using the at least one imaging device.

* * * * *